(12) United States Patent
Dote

(10) Patent No.: US 11,676,442 B2
(45) Date of Patent: Jun. 13, 2023

(54) GAME DEVICE

(71) Applicant: MARVELOUS INC., Tokyo (JP)

(72) Inventor: Shingo Dote, Tokyo (JP)

(73) Assignee: MARVELOUS INC., Tokyo (JP)

( * ) Notice: Subject to any disclaimer, the term of this patent is extended or adjusted under 35 U.S.C. 154(b) by 413 days.

(21) Appl. No.: 16/483,404

(22) PCT Filed: Jul. 11, 2017

(86) PCT No.: PCT/JP2017/025321
§ 371 (c)(1),
(2) Date: Aug. 2, 2019

(87) PCT Pub. No.: WO2018/142643
PCT Pub. Date: Aug. 9, 2018

(65) Prior Publication Data
US 2020/0013253 A1   Jan. 9, 2020

(30) Foreign Application Priority Data
Feb. 2, 2017  (JP) .............................. JP2017-017977

(51) Int. Cl.
*A63F 13/00*   (2014.01)
*G07F 17/32*   (2006.01)
(Continued)

(52) U.S. Cl.
CPC ................ *G07F 17/32* (2013.01); *A63F 9/30* (2013.01); *A63F 13/52* (2014.09); *A63F 13/5372* (2014.09)

(58) Field of Classification Search
CPC ............................ G07F 17/34; G07F 17/3265
See application file for complete search history.

(56) References Cited

U.S. PATENT DOCUMENTS 5,415,417 A * 5/1995 Reis, Jr. .................. G07F 17/32
  273/447
7,793,938 B2 * 9/2010 Watanabe ........... G07F 17/3295
  273/447
(Continued)

FOREIGN PATENT DOCUMENTS

JP   H0737281 U    7/1995
JP   2000084236 A  3/2000
(Continued)

OTHER PUBLICATIONS https://youtu.be/kMWceFg-UyE Dunk Tank machine (Year: 2013).*
(Continued)

*Primary Examiner* — David L Lewis
*Assistant Examiner* — Eric M Thomas
(74) *Attorney, Agent, or Firm* — McCoy Russell LLP

(57) ABSTRACT

A game device of the present invention has a defining part for defining an opening to allow a prize to fall, an operation part for receiving input information, a prize support member for supporting the prize, wherein the prize support member is configured to be operable by that the operation part receives the input information, and an operation control unit for controlling movement of the prize support member. The prize support member is provided above the opening so as to expose the opening. This makes it possible to provide a game device which is capable of effectively utilizing a space inside a housing and having enhanced amusement.

19 Claims, 16 Drawing Sheets

(51) Int. Cl.
    *A63F 13/52*     (2014.01)
    *A63F 13/5372*     (2014.01)
    *A63F 9/30*     (2006.01)

(56) References Cited

U.S. PATENT DOCUMENTS

2007/0026916 A1*   2/2007   Juds ........................ G07F 17/32
    463/1
2008/0001360 A1*   1/2008   Fukazawa ................ A63F 9/30
    273/448

FOREIGN PATENT DOCUMENTS

| JP | 2001149522 A | 6/2001 |
| JP | 200388679 A | 3/2003 |
| JP | 2004229751 A | 8/2004 |
| JP | 2009039303 A | 2/2009 |
| JP | 2009207942 A | 9/2009 |
| JP | 2014184339 A | 10/2014 |
| JP | 2016140371 A | 8/2016 |
| JP | 2016182522 A | 10/2016 |

OTHER PUBLICATIONS https://youtu.be/kMWceFg-UyE Dunk Tank (Year: 2013).*
ISA Japan Patent Office, International Search Report Issued in Application No. PCT/JP2017/025321, dated Oct. 3, 2017, WIPO, 2 pages.

* cited by examiner

GAME DEVICE

CROSS REFERENCE TO RELATED APPLICATIONS

The present application is a U.S. National Phase of International Patent Application Serial No. PCT/JP2017/025321 entitled "GAME DEVICE" filed on Jul. 11, 2017. International Patent Application Serial No. PCT/JP2017/025321 claims priority to Japanese Patent Application No. 2017-017977, filed on Feb. 2, 2017. The entire contents of each of the above-cited applications are hereby incorporated by reference for all purposes.

TECHNICAL FIELD

The present invention relates to a game device, and in particular game device for acquiring a prize.

BACKGROUND ART

Conventionally, a crane game machine is known as a game device for acquiring a prize. Such a crane game machine includes a prize stand to place the prize, an opening for dropping the prize, and a crane arm for moving the prize from the prize stand to the opening (for example, Patent Document 1). The crane arm has a function of holding the prize or the like and dropping it into the opening. However, if a position of the opening is fixed, the operation becomes monotonous. Therefore an attempt to improve the entertainment of the game (which do not make players get bored) has been made by changing arrangement of the prize stand and changing the position and a shape of the opening (for example, Patent Document 2).

The crane game machine disclosed in Patent Document 2 includes the prize stand, the opening and the crane arm, and is configured to be able to change a height and tilt of the prize stand. This makes it possible to for a manager of the crane game machine to freely change the position and the shape of the opening. Depending on the change, it is possible to improve the entertainment of the game by that the player operates the crane arm. However, there is a limit to the adjustment of the height and tilt of the prize stand, thereby making it difficult to maintain high entertainment of the game. Moreover, in such a crane game machine, a movable area of the crane arm occupies most of a space in a housing. Therefore, in such a crane game machine, it is difficult to effectively utilize the space in the housing.

In addition, there is a prize acquisition game machine which does not have the crane arm in order to effectively utilize the space in the housing (for example, Patent Document 3). The prize acquisition game machine includes a hook member provided above an opening, a prize suspended by a string on the hook member and cutting means for cutting the string to drop the prize into the opening. In such a prize acquisition game machine, since the operation of the cutting means is monotonous as the operation of the crane arm, there is a room for improvement from the viewpoint of preventing the player from being bored.

PRIOR ART DOCUMENTS

Patent Documents

Patent document 1: JP 2000-84236 A
Patent document 2: JP 2016-182522 A
Patent document 3: JP 2004-229751 A

SUMMARY OF THE INVENTION

Problems to be Solved by the Invention

It is an object of the present invention to provide a game device which is capable of effectively utilizing a space inside a housing and having enhanced amusement.

Means for Solving the Problems

Such an object is achieved by the present inventions (1) to (11) described below.

(1) A game device comprising:

(2) a defining part for defining an opening to allow a prize to fall; an operation part for receiving input information;

(3) a prize support member for supporting the prize, the prize support member configured to be operable by that the operation part receives the input information; and (4) an operation control unit for controlling movement of the prize support member, (5) wherein the prize support member is provided above the opening so as to expose the opening.

(2) In the game device described in the above-mentioned invention (1), the prize support member displaces so that an exposed area of the opening changes in a plan view.

(3) In the game device described in the above-mentioned invention (1) or (2), the prize support member is displaceable between a first state capable of supporting the prize and a second state capable of releasing the support of the prize.

(4) In the game device described in the above-mentioned invention (3), the prize support member displaces in a stepwise fashion from the first state to the second state.

(5) In the game device described in any one of the above-mentioned inventions (1) to (4), the prize support member is provided to be inclined with respect to a surface direction of the opening.

(6) In the game device described in any one of the above-mentioned inventions (1) to (5), the prize support member is provided to be detachable.

(7) In the game device described in any one of the above-mentioned inventions (1) to (6), the prize support member is formed into an elongated shape.

(8) In the game device described in any one of the above-mentioned inventions (1) to (7), the prize support member includes a plurality of arm members, and the plurality of arm members is provided on the defining part at one end of the plurality of arm members.

(9) In the game device described in the above-mentioned invention (8), an outer diameter of each of the arm members gradually decreases from the one end to the other end.

(10) In the game device described in any one of the above-mentioned inventions (1) to (9), the defining part defines the opening having a circular shape, an elliptical shape, a polygonal shape, a rectangular shape, or a curved shape.

(11) In the game device described in any one of the above-mentioned inventions (8) to (10), the defining part defines the opening having a circular shape, and the plurality of arm members is provided along a circumferential direction of the opening.

Effect of the Invention

According to the present invention, it is possible to provide the game device which is capable of effectively utilizing the space inside the housing and having enhanced amusement.

BRIEF DESCRIPTION OF THE DRAWINGS

FIG. 3A shows a perspective view that all the prize support member is in a first state and FIG. 3B shows a perspective view that some prize support members are in a second state.

FIG. 6A is a perspective view showing that the prize support member is in a first state and FIG. 6B is a perspective view showing that the prize support member is in a second state.

FIG. 7A is a perspective view showing that the prize support member is in a first state and FIG. 7B is a perspective view showing that the prize support member is in a second state.

DESCRIPTION OF THE EMBODIMENTS

Hereinafter, a game device of the present invention will be described in detail based on preferred embodiments with reference to the accompanying drawings. In the following description, for the convenience of explanation, the upper side in each of FIGS. 1, 3, 4, 15 and 16 will be referred to as "upper", the lower side thereof will be referred to as "lower", the left side thereof will be referred to as "left", the right side thereof will be referred to as "right", the near side of the page will be referred to as "front" and the back side of the page will be referred to as "back".

First Embodiment

Game Device

Figure 1:
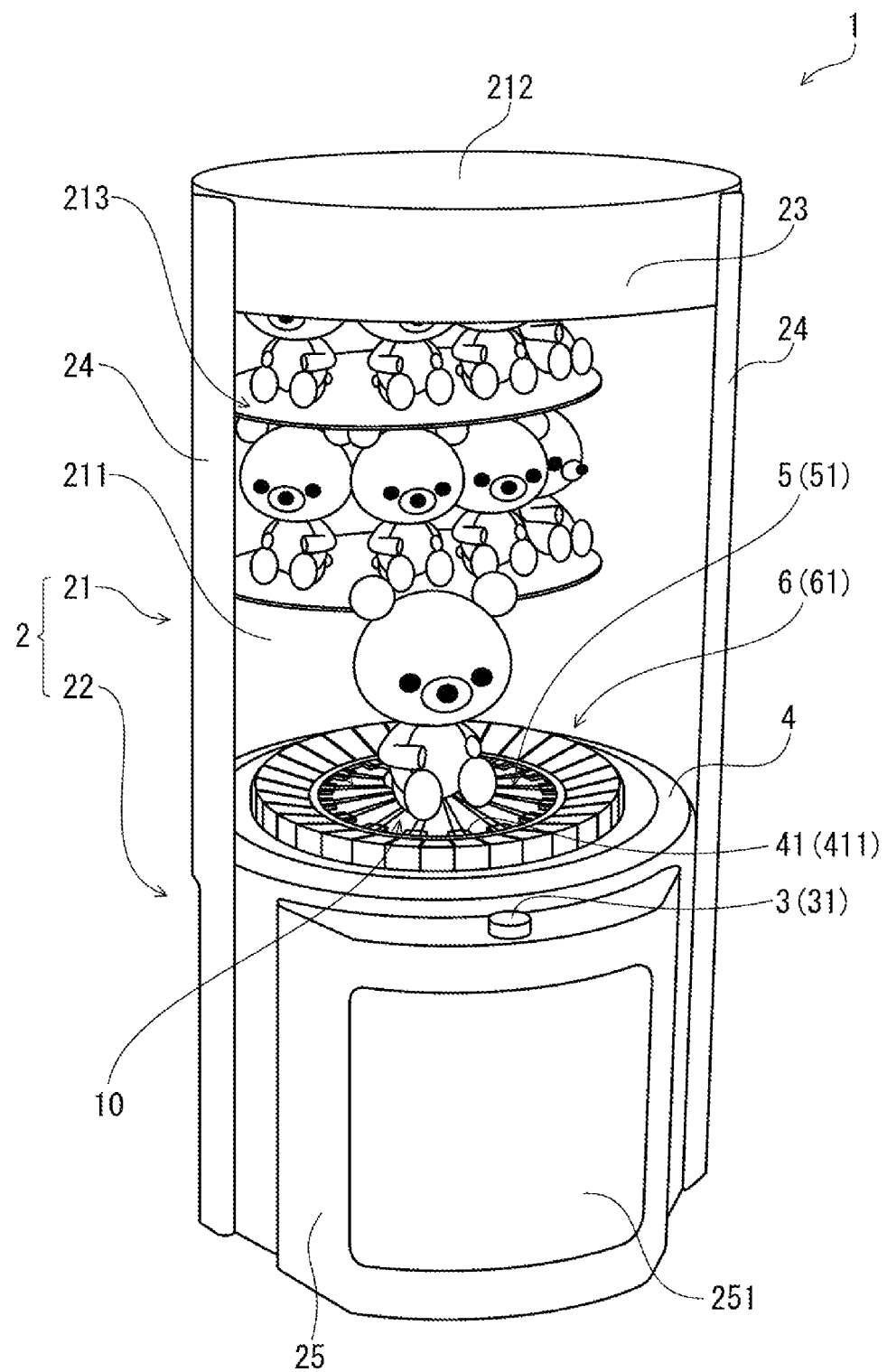
FIG. 1 is a perspective view showing a game device according to a first embodiment of the present invention.
Figure 2:
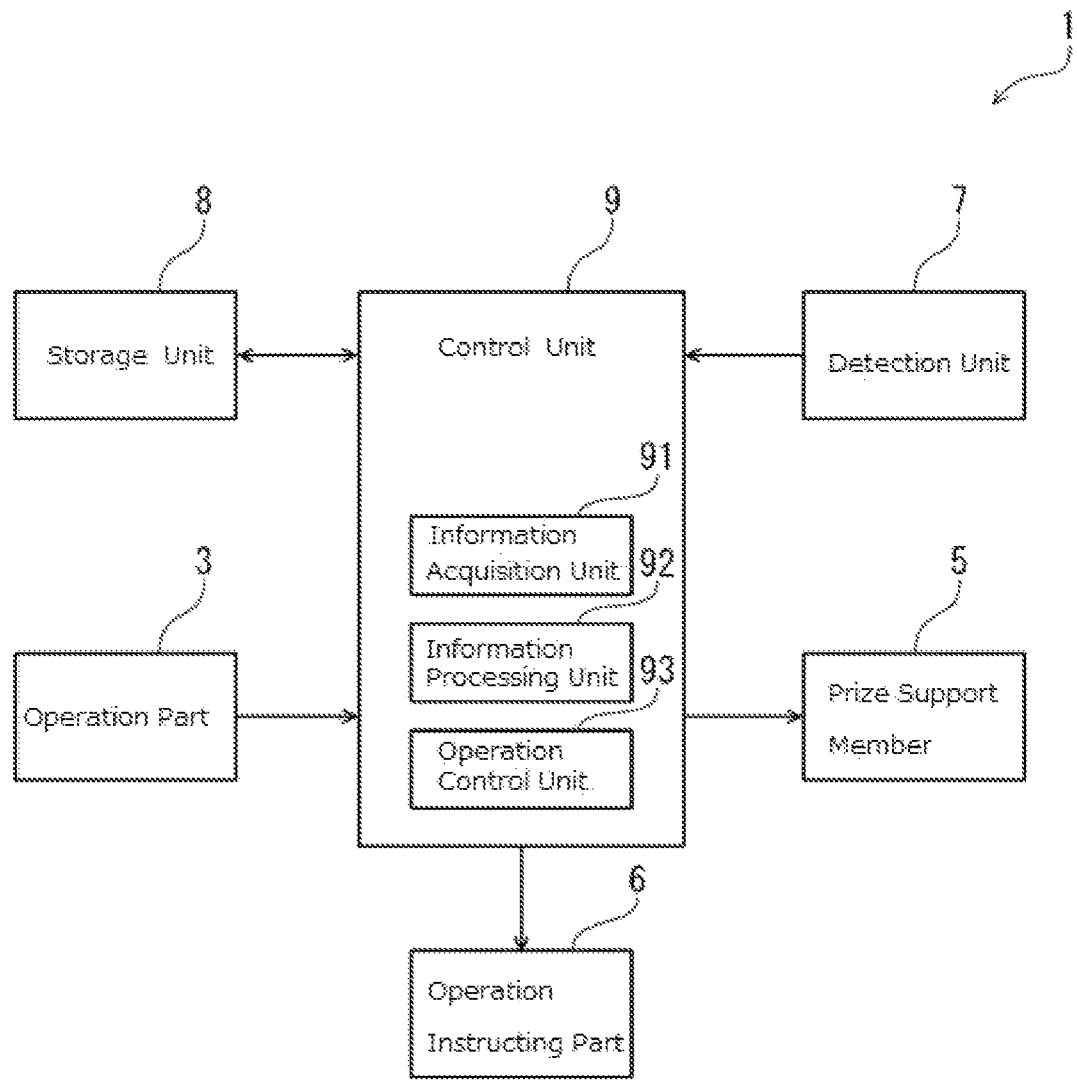
FIG. 2 is a block diagram showing a configuration of the game device according to the first embodiment of the present invention.
Figure 3A:
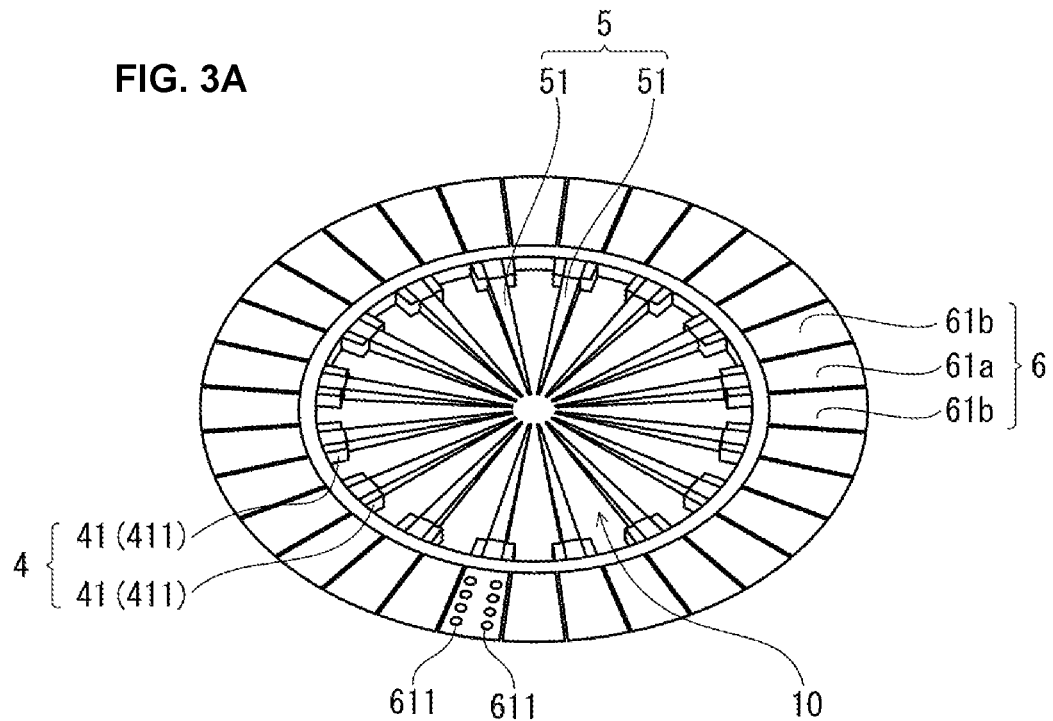
FIGS. 3A and 3B are views showing a prize support member and an operation instructing part of the game device according to the first embodiment of the present invention.
Figure 3B:
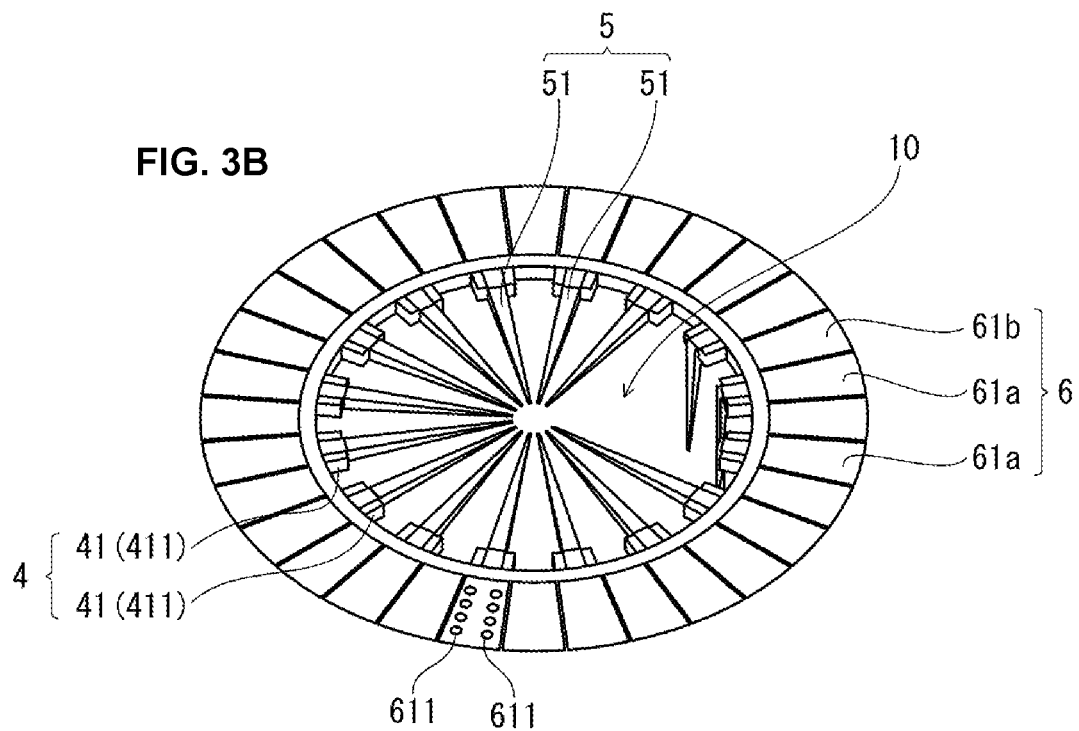
Figure 4A:
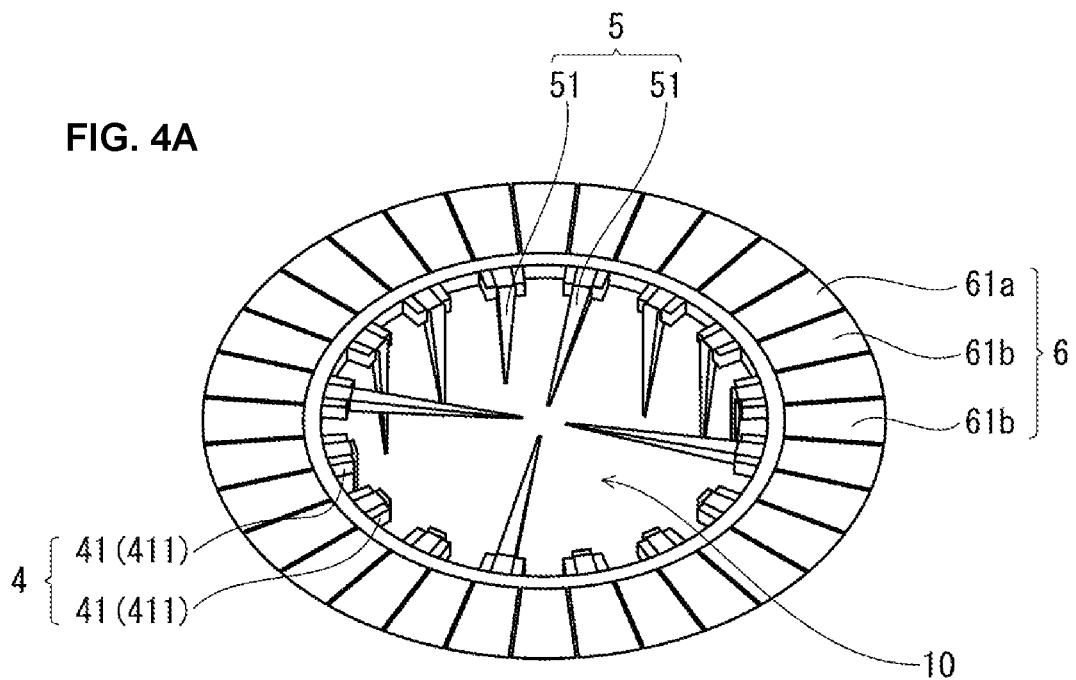
FIGS. 4A and 4B are perspective views showing an example of use of the prize support member of the game device according to the first embodiment of the present invention.
Figure 4B:
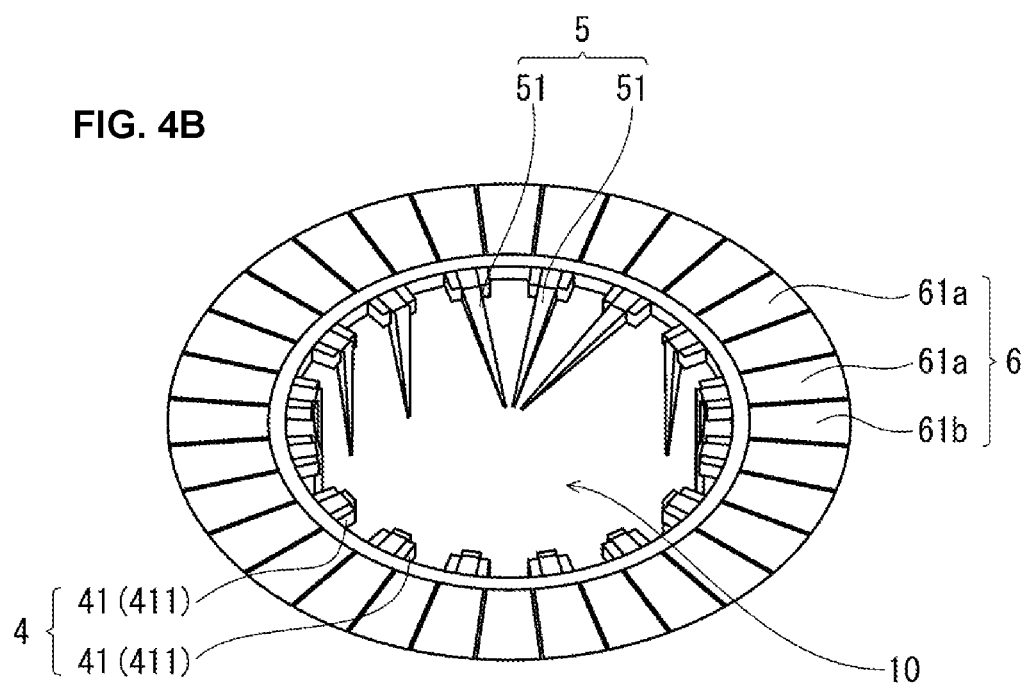

FIG. 1 is a perspective view showing a game device according to a first embodiment of the present invention. FIG. 2 is a block diagram showing a configuration of the game device according to the first embodiment of the present invention. In this regard, FIG. 2 shows only the configuration needed to explain each function of the game device, FIGS. 3A and 3B are views showing a prize support member and an operation instructing part of the game device according to the first embodiment of the present invention. FIG. 3A shows a perspective view that all the prize support member is in a first state and FIG. 3B shows a perspective view that some prize support members are in a second state. FIGS. 4A and 4B are perspective views showing an example of use of the prize support member of the game device according to the first embodiment of the present invention.

As shown in FIGS. 1 and 2, the game device 1 includes a housing 2, an operation part 3 provided in a lower part of the housing 2, a defining unit 4 which is provided in the housing 2 and defines an opening 10 for allowing a prize to fall, a prize support member 5 provided on an inner peripheral surface of the defining unit 4, and an operation instructing part 6 provided on an upper surface of the defining unit 4. Furthermore, the game device 1 includes a detection unit 7, a storage unit 8, and a control unit 9 in the housing 2.

(Housing)

The housing 2 is constituted from un upper main body 21 formed into a cylindrical shape and a lower main body 22 formed into a cylindrical shape and having a bottom. The housing 2 has a function of placing or housing each part of the game device 1. The upper main body 21 is constituted from a transparent side peripheral wall surface 211 formed into a cylindrical shape and an upper wall surface 212 closing an upper opening of the side peripheral wall surface 211. A prize is placed inside the upper main body 21. That is, a space defined by the upper main body 21 becomes a space (game space) in which a game for acquiring the prize is performed. The side peripheral wall surface 211 may be substantially transparent (colorless transparent, colored transparent, translucent) so that a player can view the game space. Further, the side peripheral wall surface 211 may be provided with a window (door) configured to be openable and closable. As a result, the manager of the game device 1 can accesses the game space from the window, thereby easily performing restocking and maintenance of the prize. Further, the housing 2 is formed of a hard resin material, a metal material, a ceramic material or the like.

Inside an upper part of the upper main body 21, provided is a display stand 213 which is constituted from a two-stage shelf erected from the inside of the side peripheral wall surface 211. The prize for display is arranged on the display stand 213. In this way, it is possible to advertise the prize that can be acquired by the player. In addition, by the presence of such a display stand 213, when the prize is acquired, the manager of the game device 1 can replenish the prize easily. In the game device 1 of the present embodiment, since a crane arm is not provided, a range to change arrangement and a shape of the display stand 213 is wider than that of a conventional crane game machine. For example, it is possible to constitute the display stand 213 so as to be able to automatically replenish the next prize when the prize is acquired. As described above, the game device 1 of the present embodiment can utilize the game space effectively.

In addition, a strip-shaped cover member 23 is provided at an upper end of the side peripheral wall surface 211 and can be used as a signage. Brace members 24 are provided on the left and right sides of the upper main body 21, respectively. The brace members 24 connect the upper main body 21 and the lower main body 22. In this regard, it is noted that the brace members 24 are also usable as the signage.

The lower main body 22 has an internal space in communication with the game space through the defining part 4 described later. This internal space is used to temporarily place a dropped prize and house the storage unit 8 and the control unit 9 described later. A prize outlet box 25 is provided on a front surface of the lower main body 22. In addition, a prize outlet 251 which communicates with the internal space of the lower main body 22 and is formed into substantially a rectangular shape is provided on a front surface of the prize outlet box 25. This makes it possible to take out the dropped prize from the prize outlet 251. Although not shown, the lower main body 22 or the prize outlet box 25 is provided with a coin insertion slot, a shielding plate for preventing from accessing to the game space from the prize outlet 251, and the like. The operation part 3 is provided at an upper part of the prize outlet box 25.

(Operation Part)

The operation part 3 is constituted from a circular push button 31 which is provided at the upper part of the prize outlet box 25. The operation part 3 has a function of receiving input information from the player, The player performs various kinds of commands to acquire the prize to the operation part 3. Specifically, the player pushes the push button 31 to stop movement (action) of the operation instructing part 6 described later at a desired timing. In the present embodiment, the number of the push button 31 is one. As a result, the player of various ages (young children and elderly people, etc.) can easily operate the game device 1. The number of the push button 31 is not particularly limited, but may be two or more. In addition, the operation part 3 may include an operation stick depending on the configuration (for example, configuration including the crane arm) of the game device 1.

(Defining Part)

The defining part 4 is provided between the upper main body 21 and the lower main body 22 of the housing 2 along inner peripheral surfaces thereof. The defining part 4 is formed into a doughnut-shaped frame and defines a circular (circular in plan view) opening 10 at a central portion thereof. This opening 10 is constituted to communicate with the game space of the upper main body 21 and the internal space of the lower main body 22 The vicinity of the opening 10 can also be used as the game space. The number, size, and shape of the opening 10 are not particularly limited. Specifically, the number of the opening 10 may be two or more. Further, the opening 10 may be formed into a closed shape in the plan view, for example, an elliptical shape, a polygonal shape, a rectangular shape, or a curved shape (for example, a shape defined by a designed curve). In this regard, in the case where the opening 10 is circular, a diameter thereof is preferably 40 to 120 cm, and more preferably 50 to 100 cm. Further, the shape of the defining part 4 is not particularly limited as long as it can define the opening 10 having a desired shape. The defining part 4 can be formed of a hard resin material, a metal material, a ceramic material, and the like. However, if the housing 2 (the lower main body 22) and the defining part 4 are integrally formed, there is no need to provide the defining part 4, independently. In this case, the housing 2 (lower main body 22) functions as the defining part 4.

Moreover, connecting portions 41 are provided on the inner peripheral surface of the defining part 4. The connecting portions 41 have a function of connecting the prize support member 5 described later. Each of the connecting portions 41 has a pair of side plate portions 411 for rotatably holding one end (proximal end) of the prize support member 5, wherein the side plate portions 411 are erected from the inner peripheral surface of the defining part 4, and a locking portion (not shown) for locking (engaging) the prize support member 5 in a predetermined state (see FIG. 3A). Thus, the defining part 4 has a function of defining the opening 10 and a function of supporting the prize support member 5.

(Prize Support Member)

The prize support member 5 is constituted from a plurality of arm members 51 (16 in the present embodiment) to support the prize. Each of the arm members 51 is formed into an elongated shape and has the same length as each other. The number of the arm members 51 is not particularly limited, but may be an odd number, an even number, or more or less than sixteen. Moreover, the length of each of the arm members 51 may be different from each other. When the prize supporting member 5 has the arm members 51 having different lengths, it is possible to increase a kind of a method (placing method) for placing the prize, thereby enabling the enhanced amusement to be provided. The prize support member 5 can be formed of a hard resin material, a metal material, a ceramic material or the like.

As shown in FIG. 3A, the proximal end of each of the arm members 51 is connected to each of the connecting portions 41 of the defining part 4. The arm member 51 is provided along a surface direction of the opening 10 from the proximal end to a distal end thereof. In other words, the arm member 51 is provided at the proximal end thereof in the defining part 4 and extends in a radial direction of the opening 10. Thus, the arm member 51 becomes in a state (first state) capable of supporting the prize. In this regard, a recess (not shown) to engage with the locking portion of the connecting portion 41 is provided at the proximal end of the arm member 51. By engaging the locking portion with the recess, it is possible for the arm member 51 to maintain the first state.

If the engagement (locking) of the locking portion of the connecting portion 41 is released from the first state, the arm member 51 pivots downward with the proximal end as a fulcrum, thereby changing to a state (second state) along a vertical direction as shown in FIG. 3B. In FIG. 3B, the three arm members 51 are in the second state. Thus, the arm members 51 are configured to be displaceable from the first state to the second state. Such displacement may be performed every arm member 51, or may be performed simultaneously with a plurality of arm members 51 (for example, three adjacent arm members 51). In the former case, since the arm members 51 are displaced one by one, it is possible for the player to enjoy the process to acquire the prize for a long time. On the other hand, in the latter case, since the plurality of arm members 51 are displaced at one time, it is possible for the player to more easily acquire the prize, that is, to lower a difficulty level of the game.

Also, an outer diameter (width and/or thickness) of each arm member 51 gradually decreases from the proximal end to the distal end. As a result, a gap between the arm members 51 is increased, so that it becomes easy to give the player an image that the prize falls, and it is possible for the player to increase an opportunity of playing the game device 1. Further, since a contact area between a distal end portion of the arm member 51 and the prize decreases, the support of the prize may be relatively unstable. As a result, when the arm member 51 is displaced from the first state to the second state, the prize becomes easy to move, and further, a possibility of the prize moving unexpectedly or a possibility of large movement as shaking increases. As a result, the player can be entertained. Further, the player can be visually given an image from which the prize can be acquired. Further, a non-slip member may be provided on an upper surface of the distal end portion of the arm member 51. For example, it is possible for such a non-slip member to prevent or suppress the prize from unintentionally falling, when placing small prizes one by one on the distal end portion of the arm member 51, and thus support the prize reliably.

Further, each arm member 51 is continuously provided along the circumferential direction of the opening 10 through a predetermined distance with each other (in a plan view, the adjacent arm members 51 form an equal side of an isosceles triangle). In this way, in the first state, the distal ends of the arm members 51 face toward the center of the opening 10. Further, the arm members 51 define a circular small opening at the center of the opening 10 in the plan view as well as 16 fan-shaped (substantially isosceles triangular) small openings between the arm members 51. Thus, the prize support member 5 is provided to divide the opening 10 into a plurality of small openings. That is, the prize support member 5 is provided without covering the whole of the opening 10, in particular covering a central portion of the opening 10. By placing the prize on the prize support member 5 having such a configuration, it is easy to give the player an image that the prize falls, and the opportunity of playing the game device 1 can be increased for the player. In addition, the formation of the small opening at the center of the opening 10 may make the support of the prize relatively unstable. As a result, when the arm members 51 displace from the first state to the second state, the prize becomes easy to move, and further the possibility of the prize moving unexpectedly or the possibility of large movement as shaking increases. As a result, the player can be entertained. Further, the player can be visually given the image from which the prize can be acquired. Furthermore, the formation of the small opening at the center of the opening 10 makes it possible for the manager to easily place the prize and easily form a pattern of the arm members 51 as shown in FIG. 4A described later (the manager previously displaces a specific arm member 51 from the first state to the second state before starting the game).

In the present embodiment, one prize (a stuffed bear) is provided to cover the central portion (small opening) of the opening 10 and be supported on the distal end side of each arm member 51 (FIG. 1). A shape, size, arrangement and placing method of the prize are not particularly limited. For example, a small prize may be placed on each arm member 51, and a plurality of medium-sized prizes may be placed over about three to five arm members 51, respectively. Only one large-sized prize having the same width (for example, width of 40 to 50 cm) as the diameter of the opening 10 may be placed on the arm members 51. Also, the prize may be hung on each arm member 51 with a string or the like. Thus, the manager of the game device 1 can adopt various kinds of the placing methods. Therefore, the player can be entertained continuously. In this regard, these placing methods can be used in combination.

Here, as shown in FIG. 1, in the case where the prize is supported by the plurality of arm members 51, even if one arm member 51 is displaced to the second state, the prize is supported by the remaining arm members 51 in the first state. Therefore, the prize cannot fall. Specifically, in the case where one arm member 51 is displaced to the second state, the center of gravity of the prize may move, not move or hardly move. For this reason, the player displaces the plurality of arm members 51, so that in order to cause the prize to fall in the shortest time (minimum number of times) (shortest route), it is possible to give the player an incentive to think the arm members 51 to be displaced. For example, depending on the shape, size, arrangement, etc. of the prize, it may be the shortest route to displace the adjacent arm members 51 in order. It may be the shortest route to displace the opposing arm members 51. As described above, in the game device 1 of the present embodiment, the player displaces the arm member 51 from the first state to the second state while considering the size and shape of the prize, thereby changing the exposed area of the opening 10 (the size of the opening 10) in the plan view. This makes it possible for the player to change the size of the opening 10 independently as compared with the conventional game machine in which the manager has changed the arrangement and size of the opening. As a result, the player can be entertained continuously.

Furthermore, the shortest route may be unclear. Specifically, since the prize support member 5 includes the plurality of arm members 51, depending on the method of placing the prize, there are arm members 51 which look as if they is supporting the prize but does not actually support the prize (including one that is in contact with the prize but receives little weight on the prize.). Even if such an arm member 51 is displaced from the first state to the second state, the center of gravity of the prize does not move or hardly moves. In this way, it is possible to obscure that arm members 51 are loaded with the prize, and thus the player can be entertained continuously. As described above, since the outer diameter of the arm member 51 gradually decreases from the proximal end to the distal end, the area where the distal end portion of the arm member 51 is in contact with the prize decreases. As a result, the degree of support becomes more unclear. This makes it possible to exhibit the above effect notably.

Thus, the prize support member 5 has the function of supporting the prize as the prize stand and a function of physically accessing the prize such as the crane arm for moving the prize to the opening 10. For this reason, in the conventional crane game machine, at least the prize stand and the crane arm are required. However, in the game device 1 of the present embodiment, only the prize support member 5 is required. Therefore, in the game device 1 of the present embodiment, the display stand 213 can be placed, for example, in an area (game space) which is the movable area of the crane arm, so that the game space can be effectively utilized. In addition, the size of the game device 1 can be made more compact than that of the conventional crane game machine.

Further, the game device 1 of the present invention can be compared with the conventional crane game device in which it is necessary to separately provide (in different places on the same plane) the prize stand to place the prize and the opening to drop the prize. In the game device 1, the prize support member 5 is provided above the opening 10. As a result, the area corresponding to the conventional prize stand and the area corresponding to the opening are integrated, so that the size and the shape of the opening 10 are not limited. Therefore, the game device 1 of the present embodiment can cope with various kinds of prizes while making its size compact.

As described above, the game device 1 according to the present embodiment can cope with the various kinds of prizes while being compact as compared with the conventional crane game machine, and thus the player can continuously enjoy the process of acquiring the prizes. Therefore, it is possible for the game device 1 of the present embodiment to effectively utilize the game space and exhibit the enhanced amusement.

Figure 15:
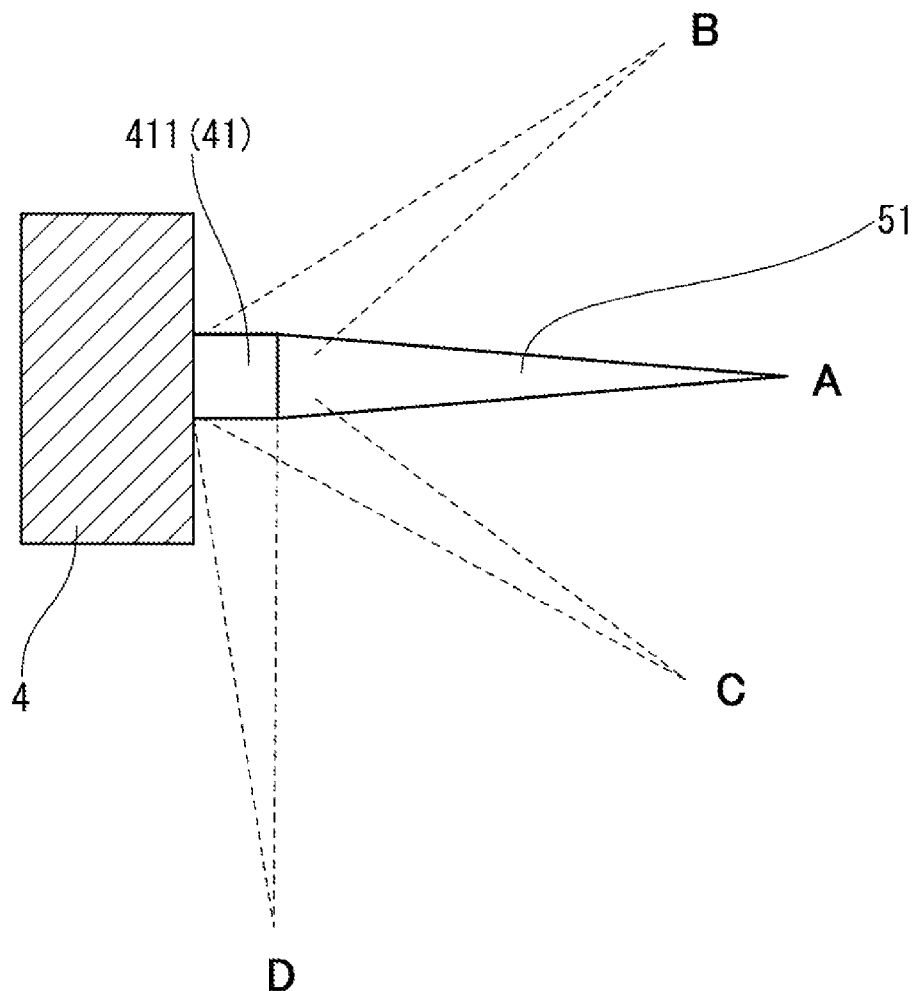
FIG. 15 shows a defining part and a prize support member of a game device according to the present invention and is a view schematically showing an example of displacement of the prize support member.
Figure 16:
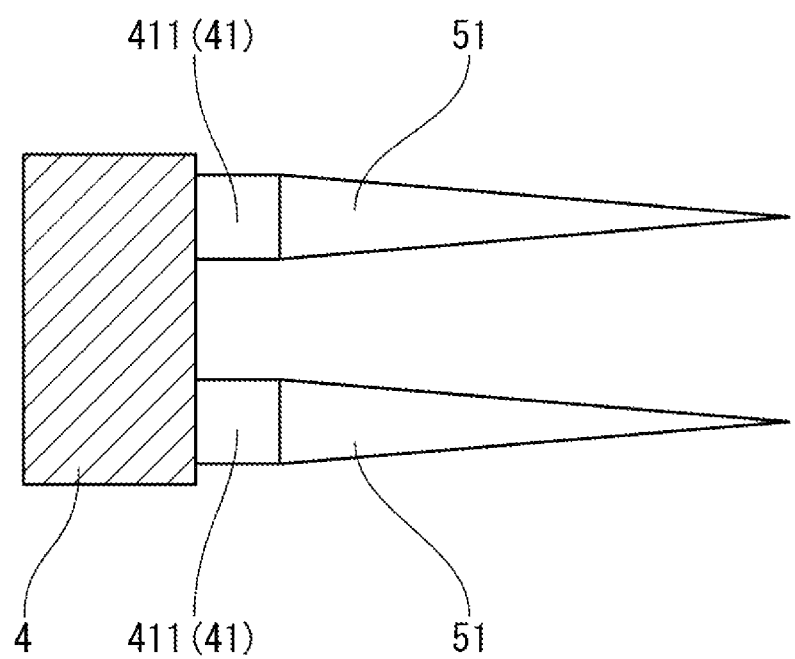
FIG. 16 shows a defining part and a prize support member of a game device according to the present invention and is a view schematically showing the prize support member configured in two stages.

As shown in FIG. 4A, before starting the game, the manager of the game device 1 sets the three or four arm members 51 to the first state and the other arm members 51 to the second state in advance. By doing so, it becomes possible to acquire the prize more easily. Thus, the manager can easily adjust the difficulty level of the game. Further, the prize support member 5 may be detachably provided to the defining part 4. This makes it possible to replace and attach, for example, the arm members 51 having different lengths and outer diameters and the arm members 51 provided with various kinds of effect members (for example, a plurality of spiny projections). Therefore, it is possible to increase the kind of the placing method of the prize or expand the range of the difficulty level of the game. As a result, the manager can freely set the configuration of the game and the player can be entertained continuously. Furthermore, if the prize support member 5 is configured as Configuration Example 2 and Configuration Example 3 described later, the manager can set the arm members 51 to a state other than the first state and the second state. Specifically, the manager can set the arm members 51 in advance so that angles of the arm members with respect to connecting portions 41 (angles with respect to the surface direction of the opening 10) are different from each other (for example, the adjacent arm members 51 become in the state of B and the state of C in FIG. 15). This further increases the possibility that the prize moves unexpectedly, and can visually give the player the image from which the prize can be acquired. Further, as shown in FIG. 16, if the plurality of connecting portions 41 are provided at different positions in the vertical direction (height direction) of the defining part 4, it is possible to provide the prize support member 5 in two stages (constitute in two-stage type) and constitute so that the heights of the arm members 51 in the first state are different from each other. This makes it possible to enhance the amusement of the game, so that the player can be more continuously entertained. In this regard, in the case where the prize support member is constituted in two-stage type, the connection portions 41 may be provided so that upper and lower arm members 51 may not interfere. After the game is started, the arm member 51 to be displaced is instructed by the operation instructing part 6.

(Operation Instructing Part)

1. The operation instructing part 6 is constituted from a plurality (32 in the present embodiment) of block bodies 61 provided on the defining part 4. The number of the block bodies 61 is not particularly limited, but may be an odd number or an even number and more or less than 32. The block bodies 61 are continuously provided along the circumferential direction of the opening 10 so as to surround the prize support member 5 and the opening 10. In other words, the operation instructing part 6 and the prize support member 5 (constituent members of a movable unit) are provided concentrically.

The plurality of block bodies 61 are constituted from 16 corresponding block bodies 61a which lie adjacent to the arm members 5 and are provided so as to correspond to the arm members 51 and 16 non-corresponding block bodies 61b which are provided between the arm members 51 and provided so as not to correspond to the arm members 51. In other words, the corresponding block bodies 61a and the non-corresponding block bodies 61b are provide alternately.

Each of the block bodies 61 is formed into a substantially rectangular parallelepiped shape and has some lighting devices (for example, LED devices) 611 therein. FIG. 3A shows the lighting devices 611 provided in the one block body 61. In this regard, it is to be noted that FIG. 3A does not show the lighting devices 611 of other (31) block bodies 61 and FIG. 4A does not show the lighting devices 611 of the block bodies 61. Each of the lighting devices 611 is constituted from a plurality of LEDs (eight in the present embodiment). Lighting and blinking of the lighting devices 611 are controlled by the control unit 9 described later. Specifically, the lighting devices 611 of each of the block bodies 61 are controlled to blink in accordance with a predetermined program or randomly. For example, the lighting devices 611 are controlled to sequentially blink in a clockwise fashion or a counterclockwise fashion. As a result, the lighting devices 611 of the block bodies 61 blink sequentially in a predetermined direction. Thus, the player aims at the moment when the lighting devices 611 of the block body 61 corresponding to the arm member 51 to be displaced light up to operate the operation part 3 (the push button 31 is pushed). By lighting only the lighting devices 611 which have lit when pushed, the presence or absence (presence or absence of the arm member 51 to be displaced) of the arm member 51 corresponding to the block body 61 of the lighting devices 611 during lighting is instructed to the player by the operation instructing part 6. As described above, the operation instructing part 6 corresponds to the prize support member 5 and has a function of instructing the player to operate the operation part 3 and a function of instructing the presence or absence of the arm member 51 to be displaced. The lighting devices 611 of the block body 61 which has lit when the player operates may be detected by the detection unit 7.

In the present embodiment, the corresponding block bodies 61a and the arm members 51 are provided on a one-to-one basis, but the present invention is not limited to this. For example, one corresponding block body 61a may be provided to correspond to the plurality of (for example, 2 to 8) arm members 51 provided continuously. The one corresponding block body 61a corresponding to the plurality of arm members 51 is larger than the corresponding block body 61a corresponding to the arm member 51 on the one-to-one basis. If such a large corresponding block body 61a is selected by the player's operation (namely, the push button 31 is pushed while the lighting devices 611 is lit), it is possible to displace the plurality of arm members 51 corresponding to the large corresponding block body 61a, collectively. This makes it possible to give the player a feeling of winning and to improve the enhanced amusement.

Further, the plurality of (for example, 2 to 8) block bodies 61 corresponding to the arm member 51 on the one-to-one basis may be constituted as one group, which is simultaneously lit and blinked. Even with such a configuration, when the grouped block bodies 61 are selected by the operation of the player (the push button 31 is pushed while the lighting devices 611 are lit), it is possible to displace the plurality of arm members 51, collectively. Therefore, the above effects can be exhibited.

(Detection Unit)

The detection unit 7 is constituted from various kind of sensors (not shown) having a function of detecting the movement of each part of the game device 1 and is arranged to be able to detect the movement of each part. For example, it is possible for the detection unit 7 to detect that the prize falls with a camera provided in the lower main body 22. In addition, the detection unit 7 may be constituted from a weight sensor, a pressure-sensitive sensor, a photoelectric sensor, or the like provided on the arm members 51. By doing so, the detection unit 7 can detect the state (first state or second state) of the arm members 51 or fall of the prize. The detection unit 7 may be also constituted from a camera provided in the game space of the upper main body 21. By doing so, the detection unit 7 can also detect the lighted block bodies 61 (the lighted lighting devices 611) and the fall of the prize. The configuration of the detection unit 7 is not particularly limited as long as it includes the various kind of sensors capable of exerting such a function. Further, the manager of the game device 1 may manage whether the prize falls or not. In such a case, the detection unit 7 can be omitted.

Each part constituting game device 1 as described above may be formed integrally. For example, the defining part 4 and the prize support member 5 may be formed integrally. The connecting portions 41 and the arm members 51 may be formed integrally. In addition, the game device 1 of the present invention may not have the detection unit 7.

As described above, the game device 1 has the housing 2, the operation part 3, the defining part 4, the prize support member 5, the operation instructing part 6, and the detection unit 7. Further, the game device 1 has the storage unit 8 and the control unit 9 which are provided in the lower main body 22 of the housing 2. In the following, description will be made on the storage unit 8 and the control unit 9 as well as Other Configuration Examples of the prize support member 5 and an operation method of the game device of the present embodiment in detail.

(Storage Unit)

The storage unit 8 includes a game program to be executed by a CPU, a ROM for storing sound information and the like, and a RAM for temporarily storing operation results to be executed by the CPU. Specifically, the storage unit 8 stores, for example, a pattern (flashing pattern) such as a speed (flashing speed) at which the lighting devices 611 of the block bodies 61 sequentially blink or a direction (flashing direction) in which they sequentially blink. Further, the storage unit 8 also stores the state of the prize support member 5 (as to whether the arm members 51 are in the first state or the second state or not) and a combination of the arm members 51 in the first state at time of starting the game (see FIG. 4A). Furthermore, the storage unit 8 stores the plurality of arm members 51 provided in the prize support member 5 and the plurality of block bodies 61 provided in the operation instructing part 6 in association with each other. Specifically, the storage unit 8 stores them in, for example, a correspondence relationship (correspondence table) as shown in Table 1 below.

TABLE 1

| Plurality of arm members | Plurality of block bodies |
| --- | --- |
| 1 | 1 |
|   | 2 |
| 2 | 3 |
|   | 4 |
| 3 | 5 |
|   | 6 |
| 4 | 7 |
|   | 8 |
| 5 | 9 |
|   | 10 |
| 6 | 11 |
|   | 12 |
| 7 | 13 |
|   | 14 |
| 8 | 15 |
|   | 16 |
| 9 | 17 |
|   | 18 |
| 10 | 19 |
|   | 20 |
| 11 | 21 |
|   | 22 |
| 12 | 23 |
|   | 24 |
| 13 | 25 |
|   | 26 |
| 14 | 27 |
|   | 28 |
| 15 | 29 |
|   | 30 |
| 16 | 31 |
|   | 32 |

That is, the storage unit 8 stores the arm members 51 to which the numbers of 1 to 16 are assigned and the block bodies 61 to which the numbers of 1 to 32 are assigned. Further, the storage unit 8 stores the block bodies 61 to which the odd number is assigned as the corresponding block bodies 61a corresponding to the arm members 51 and the block bodies 61 to which the even number is assigned as the non-corresponding block bodies 61B not corresponding to the arm members 51. The storage unit 8 may store the block bodies 61 to which the even number is assigned as the corresponding block bodies 61a and the block bodies 61 to which the odd number is assigned as the non-corresponding block bodies 61b. In addition, the storage unit 8 may store only the arm members 51 and the corresponding block bodies 61a on a one-to-one basis.

As a result, it is possible for an information processing unit 92 descried later to determine the presence and absence of the arm member 51 corresponding to the block body 61 which has been lit when the player operates, and the number if there is a corresponding arm member 51. For example, in the case where the seventh block body 61 (corresponding block body 61a) is lit, the information processing unit 92 determines that the fourth arm member 51 is the corresponding arm member 51. On the other hand, in the case where the eighth block body 61 (non-corresponding block body 61b) is lit, the information processing unit 92 determines that there is no arm member 51 corresponding thereto.

(Control Unit)

The control unit 9 includes the CPU that executes the game program and controls the whole of game device 1. Specifically, the control unit 9 includes: an information acquisition unit 91 that receives information on the state of the prize support member 5 and the lighting of the operation instructing part 6 and information as to whether or not the prize fell (information detected by the detection unit 7); an information processing unit 92 that processes the information received by the information acquisition unit 91; and an operation control unit 93 that controls the movement of the prize support member 5 and the operation instructing part 6.

(Information Acquisition Unit)

The information acquisition unit 91 has a function of receiving various kinds of information. Specifically, the information acquisition unit 91 receives the input information from the operation part 3, the information on the state (first state or second state) of each arm member 51, and the information to determine the lighted lighting devices 611 (block body 61 selected by the player) at the time of input to the operation part 3. The information processing unit 92 processes the received information.

(Information Processing Unit)

The information processing unit 92 has a function of processing the whole of the game and in particular a function of processing the information received by the information acquisition unit 91 and instructing the operation control unit 93. Specifically, the information processing unit 92 determines the presence or absence of the corresponding arm member 51 based on the information on the block body 61 that has been lit by the input to the operation part 3 and the correspondence table (Table 1) stored in the storage unit 8. Further, in the case where there is the corresponding arm member 51, the information processing unit 92 determines the number assigned to the arm member 51 and instructs the operation control unit 93 to operate the determined arm member 51.

For example, referring to Table 1, in the case where the block body 61 which has been lit at the time of the input to the operation part 3 is the fourth block body 61 (non-corresponding block body 61*b*), the information processing unit 92 determines that there is no corresponding arm member 51. Further, for example, in the case where the block body 61 which has been lit at the time of the input to the operation part 3 is the fifth block body 61 (corresponding block body 61*a*), the information processing unit 92 determines that there is the corresponding arm member 51 and it is the third arm member 51. The information processing unit 92 instructs the operation control unit 93 to operate the determined arm member 51.

(Operation Control Unit)

The operation control unit 93 has a function of controlling the movement of the prize support member 5 and the operation instructing part 6. For example, the operation control unit 93 controls the movement of the operation instructing part 6 as follows. That is, the operation control unit 93 controls the lighting and the blinking so that the lighting devices 611 incorporated in each block body 61 sequentially blink. Furthermore, the operation control unit 93 can control the blinking direction in a clockwise or counterclockwise direction and the blinking speed freely. As a result, for example, it is possible to decrease the blinking speed to lower the difficulty level of the game and to increase the blinking speed to increase the difficulty level of the game. In addition, the difficulty level of the game can be further increased by randomly changing the blinking direction and the blinking speed.

It is also possible for the operation control unit 93 to control so as to light and blink a part of or all the plurality of block bodies 61 simultaneously. Specifically, in the case where the lighting devices 611 incorporated in the each of the block bodies 61 sequentially blink, as shown in Table 2 below, it is also possible for the operation control unit 93 to control so as to sequentially blink the first to third block bodies 61 simultaneously, the fourth to the seventeenth block bodies 61 individually, the eighteenth to twenty-fourth block bodies 61 simultaneously, and twenty-fifth to thirty-second block bodies individually. As a result, if the push button 31 is pushed when the first to third block bodies 61 blink simultaneously, the first arm member 51 and the second arm member 51 are displaced at the same time, so that it is possible to give the player a feeling of being hit. Further, if the push button 31 is pushed when the eighteenth to twenty-fourth block bodies 61 blink simultaneously, the tenth arm member 51, the eleventh arm member 51 and the twelfth arm member 51 are simultaneously displaced. Therefore, it is possible to give the player a feeling of being a big hit.

Also, for example, as shown in Table 3 and Table 4 below, the operation control unit 93 can also control so as to sequentially blink continuous two or eight block bodies 61 simultaneously. As shown in Tables 3 and 4, it is possible to necessarily displace any one of the arm members 51 by simultaneously blinking the block bodies 61 with the odd and even numbers. Therefore, it is possible to give the player a feeling that there is no hit, so that it is possible for the player to increase the opportunity to play the game device 1.

TABLE 2

| Plurality of arm members | Plurality of block bodies | |
|---|---|---|
| 1 | 1 | |
|   | 2 | Blinking simultaneously |
| 2 | 3 | (Hit) |
|   | 4 | |
| 3 | 5 | |
|   | 6 | |
| 4 | 7 | |
|   | 8 | |
| 5 | 9 | |
|   | 10 | |
| 6 | 11 | |
|   | 12 | |
| 7 | 13 | |
|   | 14 | |
| 8 | 15 | |
|   | 16 | |
| 9 | 17 | |
|   | 18 | |
| 10 | 19 | |
|   | 20 | |
| 11 | 21 | Blinking simultaneously |
|   | 22 | (Big Hit) |
| 12 | 23 | |
|   | 24 | |
| 13 | 25 | |
|   | 26 | |
| 14 | 27 | |
|   | 28 | |
| 15 | 29 | |
|   | 30 | |
| 16 | 31 | |
|   | 32 | |

TABLE 3

| Plurity of arm members | Plurality of block bodies | |
|---|---|---|
| 1 | 1 | Blinking simultaneously |
|   | 2 |   |
| 2 | 3 |   |
|   | 4 |   |
| 3 | 5 | Blinking simultaneously |
|   | 6 |   |
| 4 | 7 |   |
|   | 8 |   |
| 5 | 9 | Blinking simultaneously |
|   | 10 |   |
| 6 | 11 |   |
|   | 12 |   |
| 7 | 13 | Blinking simultaneously |
|   | 14 |   |
| 8 | 15 |   |
|   | 16 |   |
| 9 | 17 | Blinking simultaneously |
|   | 18 |   |
| 10 | 19 |   |
|   | 20 |   |
| 11 | 21 | Blinking simultaneously |
|   | 22 |   |
| 12 | 23 |   |
|   | 24 |   |
| 13 | 25 | Blinking simultaneously |
|   | 26 |   |
| 14 | 27 |   |
|   | 28 |   |
| 15 | 29 | Blinking simultaneously |
|   | 30 |   |
| 16 | 31 |   |
|   | 32 |   |

TABLE 4

| Plurality of arm members | Plurality of block bodies | |
|---|---|---|
| 1 | 1 |   |
|   | 2 |   |
| 2 | 3 |   |
|   | 4 |   |
| 3 | 5 | Blinking simultaneously |
|   | 6 |   |
| 4 | 7 |   |
|   | 8 |   |
| 5 | 9 |   |
|   | 10 |   |
| 6 | 11 |   |
|   | 12 |   |
| 7 | 13 | Blinking simultaneously |
|   | 14 |   |
| 8 | 15 |   |
|   | 16 |   |
| 9 | 17 |   |
|   | 18 |   |
| 10 | 19 |   |
|   | 20 |   |
| 11 | 21 | Blinking simultaneously |
|   | 22 |   |
| 12 | 23 |   |
|   | 24 |   |
| 13 | 25 |   |
|   | 26 |   |
| 14 | 27 |   |
|   | 28 |   |
| 15 | 29 | Blinking simultaneously |
|   | 30 |   |
| 16 | 31 |   |
|   | 32 |   |

Further, the operation control unit 93 controls the movement of the prize support member 5 as follows. That is, as shown in FIG. 15, the operation control unit 93 basically controls the prize support member 5 so as to displace from the first state (state A in FIG. 15) to the second state (state D in FIG. 15). Also, as shown in the Other Configuration Examples below, the operation control unit 93 controls the prize support member 5 so as to displace in multiple steps (stepwise) or return the prize support member 5 in the second state to the first state. Specifically, referring to FIG. 15, the operation control unit 93 can control so as to displace the prize support member 5 upward (state B in FIG. 15) from the first state (state A in FIG. 15), and then displace from the state to the second state (state D of FIG. 15) directly or the second state in a stepwise manner via, for example, the state C in FIG. 15. In addition, the operation control unit 93 can control so as to displace the prize support member 5 from the state C to the state B in FIG. 15, and then from the state to the second state directly or the second state in the stepwise manner via, for example, the state C in FIG. 15. Furthermore, the operation control unit 93 can also control so as to vibrate the prize support member 5 when the prize support member 5 is displaced (operated). By controlling the prize support member 5 in this manner, it is possible to enhance the entertainment of the game device 1, so that it is possible to entertain the player more continuously. Further, by displacing the prize support member 5 upward, it is possible to move the prize largely, thereby enabling an image capable of acquiring the prize to be given to the player visually. As a result, it is possible for the player to increase the opportunity to play the game device 1.

2. Other Configuration Examples

Other Configuration Example 1 of the Prize Support Member

In the present embodiment, each arm member 51 is provided along the surface direction of the opening 10 from the proximal end to the distal end in the first state. However, at least one arm member 51 may be provided to be inclined with respect to the surface direction of the opening 10. Specifically, for example, in the case where the arm members 51 are provided to be inclined downward toward the center in the radial direction of the opening 10, the prize tends to fall easily, and thus the difficulty level of the game can be lowered. On the other hand, in the case where the arm members 51 are provided to be inclined upward toward the center in the radial direction of the opening 10, the prize tends to become difficult to fall, and thus the difficulty level of the game can be increased. The downwardly inclined arm members 51 and the upwardly inclined arm members 51 may be used in combination. Although an inclination angle is not particularly limited, it is preferably 15 to 60°, and more preferably 30 to 45° with respect to the surface direction (radial direction) of the opening 10. According to such a Configuration Example, it is possible to expand the range of the difficulty level of the game to be selected, so that it is possible to provide the game device 1 which is easy to maintain the enhanced entertainment of the game (it is difficult for the player to get bored).

Other Configuration Example 2 of the Prize Support Member

Further, the arm members 51 may be configured to displace in multiple steps (stepwise) from the first state to the second state by having a plurality of recesses which engage with the locking portions of the connecting portions 41. By displacing the arm members 51 supporting the prize in the stepwise fashion, the posture of the prize changes in the stepwise fashion (finely). As a result, a degree of the weight of the prize to the arm members 51 also changes finely, so that it becomes difficult for the player to grasp which arm members 51 are loaded with the prize and how much weight is loaded to the arm members 51. This makes it possible for the player to enjoy the process of acquiring the prize more.

Other Configuration Example 3 of the Prize Support Member

Further, a drive mechanism for driving the prize support member 5 may be provided in the lower main body 22 so that the arm members 51 return from the second state to the first state automatically. With such a configuration, for example, in the case where the block bodies 61 corresponding to the arm members 51 in the second state are lit by the operation (input) of the player, the arm members 51 can be returned to the first state, thereby enabling the difficulty of level of the game to be increased. In addition, when the game ends, the arm members 51 in the second state automatically may return to the first state. By doing so, it is possible to increase an operation rate of the game devices 1 as compared to the case where the manager manually returns it. In this regard, it should be noted that, in the case where the game ends without acquiring the prize, it may be retained that the arm members 51 in the second state are automatically returned to the first state for a predetermined time and the play is resumed during this time. Thus, the player (including other players who have not played the game from the beginning) can resume the game halfway, so that it is possible to give the player an incentive to play the game device 1. In this case, the above effect can be exhibited more effectively by displaying a predetermined time on a display unit (such as an electric bulletin board). Further, if the storage unit 8 stores a combination of the arm members 51 in the first state at the time of starting the game (see FIG. 4A), it is possible to save the trouble that the manager of the game device 1 sets the combination of the arm members 51 in the first state manually before starting the game.

Moreover, various kinds of effects can be performed by providing the drive mechanism. For example, it is possible for the operation control unit 93 to control so as to displace the arm members 51 in the first state or the second state sequentially (for example, clockwise) to the second state or the first state and return them to the original state. Also, for example, the operation control unit 93 can control so that the states of all the arm members 51 are inverted collectively. Specifically, the operation control unit 93 can collectively displace the arm members 51 in the first state to the second state and the arm members 51 in the second state to the first state. If such an effect is performed while the game is not being performed, since the prize moves (for example, a bear's stuffed toy moves largely), it is possible to visually provide the player with the entertainment of the game of the game device 1 which is different from the entertainment of the game of the conventional game machine. Further, it is possible to visually give the player an image on which the prize falls by moving the prize. As a result, it is possible to give the player the incentive to play the game device 1. In addition, in the case where the game ends without acquiring the prize or during the game, if such an effect is performed, a function of resetting the arrangement of the prize works. This makes it possible for the player to increase the opportunity to play the game device 1.

Further, the operation control unit 93 may control so as to necessarily return the arm members 51 displaced to the second state during the game to the first state after a predetermined time (for example, 60 seconds to 180 seconds). As a result, the difficulty level of the game is increased, and the player can be entertained continuously.

Further, in the case where the prize is hung on the arm members 51 with the string or the like, if the string is fixed to the arm members 51, the dropped prize is automatically pulled up by the operation of the player, so that it is possible to start the next game without replenishing the prize. In this case, a receipt of the prize may be separately performed at a store counter.

Other Configuration Example 4 of the Prize Support Member

Further, a vibrating body may be provided in the arm members 51 so that the arm members 51 vibrate when the prize support member 5 operates. The vibration is generated by displacing the arm members 51 minutely with the connecting portions 41 as a fulcrum due to the vibration of the vibrating body. For example, after one arm member 51 is displaced (in particular, after the displacement in the stepwise fashion), the arm member 51 may be configured to vibrate. Before the one arm member 51 is displaced, the arm member 51 may be configured to vibrate. Further, when one arm member 51 is displaced to the second state, arm members 51 different from the displaced arm member 51 (for example, the arm member 51 adjacent to the displaced arm member 51) may be configured to vibrate. This increases the possibility that the prize becomes in an unexpected posture, and therefore the player can enjoy the process of acquiring the prize more. Such vibration may be controlled to generate (evenly) in a certain magnitude within a predetermined time or controlled to generate intermittently. The vibrating body may be further provided on the locking portion or the side plate portions 411 of each connecting portion 41. As described above, it is possible to exhibit the above effect more remarkably by providing a plurality of vibrating bodies in different places.

3. Method of Operating Game Device

Figure 5:
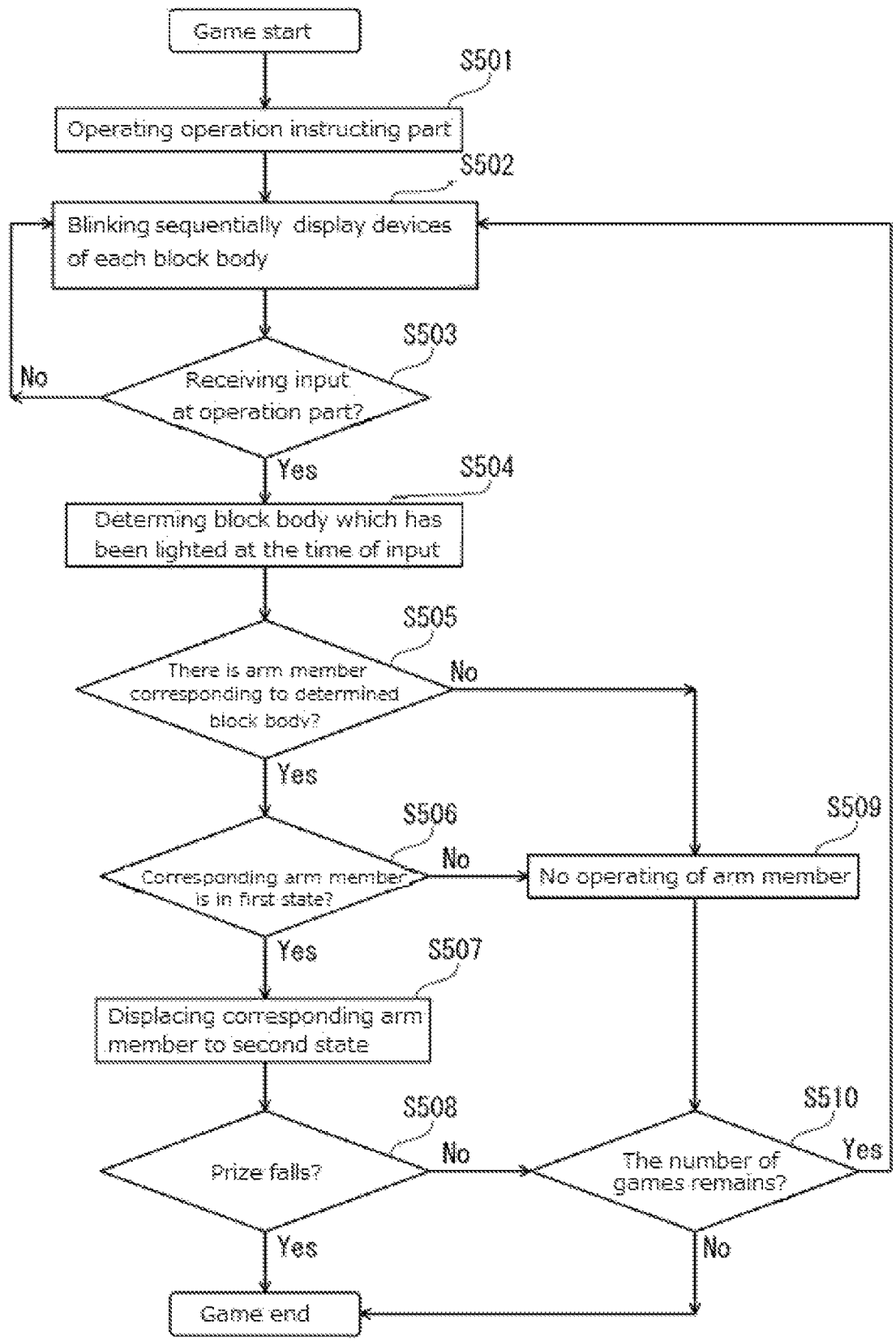
FIG. 5 is a flowchart showing a flow of the whole of a game of the game device according to the first embodiment of the present invention.

Next, description will be made on a method of operating the game device of the present embodiment in detail. FIG. 5 is a flowchart showing a flow of the whole of a game of the game device according to the first embodiment of the present invention.

As shown in FIG. 5, when the game is started, the operation control unit 93 operates the operation instructing part 6 (S501) and blinks the lighting devices 611 of each of the block bodies 61 sequentially (S502). In this regard, the process of the step S501 may be performed before the game starts. In this case, for example, before the game starts, the blinking direction of the lighting devices 611 of the block bodies 61 may be randomly controlled and the blinking direction may be fixed at the time of starting the game.

Further, the information acquisition unit 91 receives a player's intention to start the game (for example, coin insertion), and thus the information processing unit 92 determines the start of the game based on this information. At this time, the number of games (the number capable of trying the game) is set according to the number of inserted coins and the like. Next, the process proceeds to the step S503.

In a state where each block body 61 blinks in sequence, the player inputs to the operation part 3 by aiming the moment when the block body 61 corresponding to the arm member 51 to be displaced is lighted. If there is no input to the operation part 3 (No in S503), the processes of the steps S502 and S503 are repeated.

In the case where there is an input to the operation part 3 (Yes in S503), the information acquisition unit 91 receives the input information. The information processing unit 92 determines the block body 61 which has been lit at the time of the input based on the input information received by the information acquisition unit 91 (S504). At this time, the information processing unit 92 instructs the operation control unit 93 to operate the determined block body 61. The operation control unit 93 lights only the determined block body 61.

Thereby, the player can confirm the selected block body 61 and whether the desired arm member 51 has been selected. During this time, the information processing unit 92 determines the presence and absence of the arm member 51 corresponding to the determined block body 61 from the correspondence table (Table 1) of the storage unit 8 described above (S505).

In the case where there is the corresponding arm member 51, for example, in the case where the fifth block body 61 is lighted, the information processing unit 92 determines the third arm member 51 corresponding to the lighted block body 61 (Yes in S505). In this case, the process proceeds to the step S506. Then, the information processing unit 92 determines whether the third arm member 51 is in the first state. In the case where the third arm member 51 is in the first state (Yes in S506), the operation control unit 93 displaces the third arm member 51 to the second state (S507). The process proceeds to the step S508. Then, the information processing unit 92 determines whether the prize has fallen by displacing the third arm member 51 to the second state (S508) or not. In the case where the prize has fallen (Yes in S508), the game ends. On the other hand, in the case where the prize has not fallen (No in S508), the process proceeds to the step S510.

On the other hand, referring to the step S505, in the case where there is no corresponding arm member 51, for example, in the case where the fourth block body 61 is lighted, the information processing unit 92 determines that there is no corresponding arm member 51 (No in S505). Then, the operation control unit 93 controls not to operate the arm member 51 (S509). Further, even if the fifth block body 61 is selected in the step S506, in the case where the information processing unit 92 determines that the third arm member 51 corresponding to the block body 61 is not in the first state (No in S506), that is, the case where the information processing unit 92 determines that the third arm member 51 has been already displaced to the second state, the operation control unit 93 controls not to operate the arm member 51 (S509). After the step S509, the process proceeds to the step S510.

In the step S510, the information processing unit 92 determines whether the number of games remains or not. In the case where the number of games remains (Yes in S510), the process returns to the step S502. In the case where the number of games does not remain (No in S510), the game ends.

As described above, the processing method can be created with the program executed by the computer. Such a program is realized by the CPU (central processing unit), the microprocessor (micro processor), the GPU (graphic processing unit), the RAM (Random Access Memory), the ROM (Read Only Memory), and the like.

Second Embodiment

Next, description will be made on a second embodiment of the game device of the present invention with reference to the attached drawings.

Figure 6A:
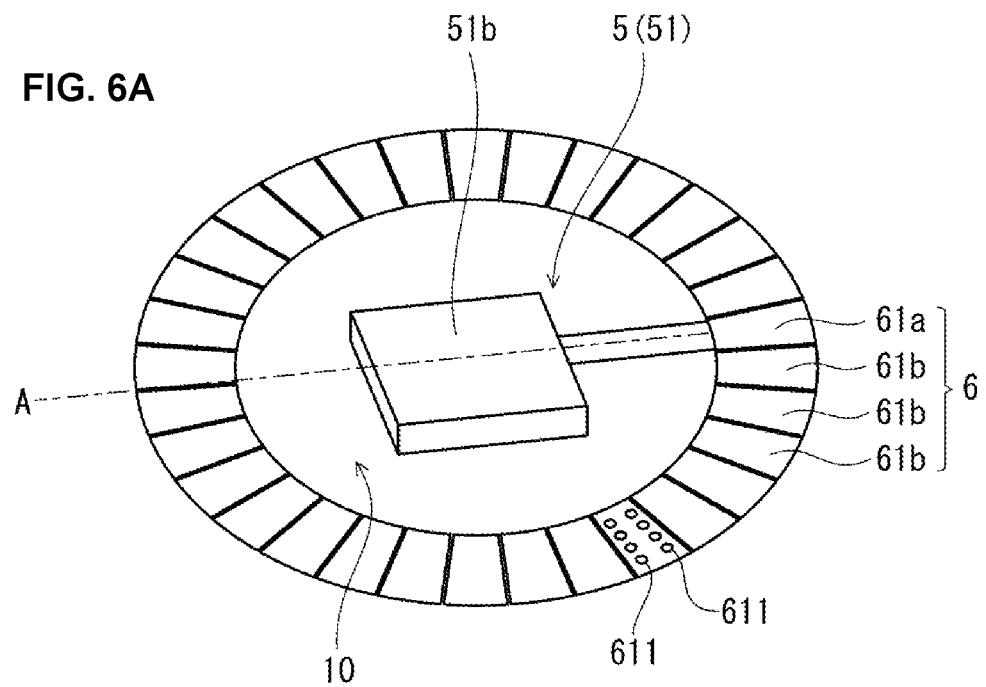
FIGS. 6A and 6B show a prize support member and an operation instructing part of a game device according to a second embodiment of the present invention.
Figure 6B:
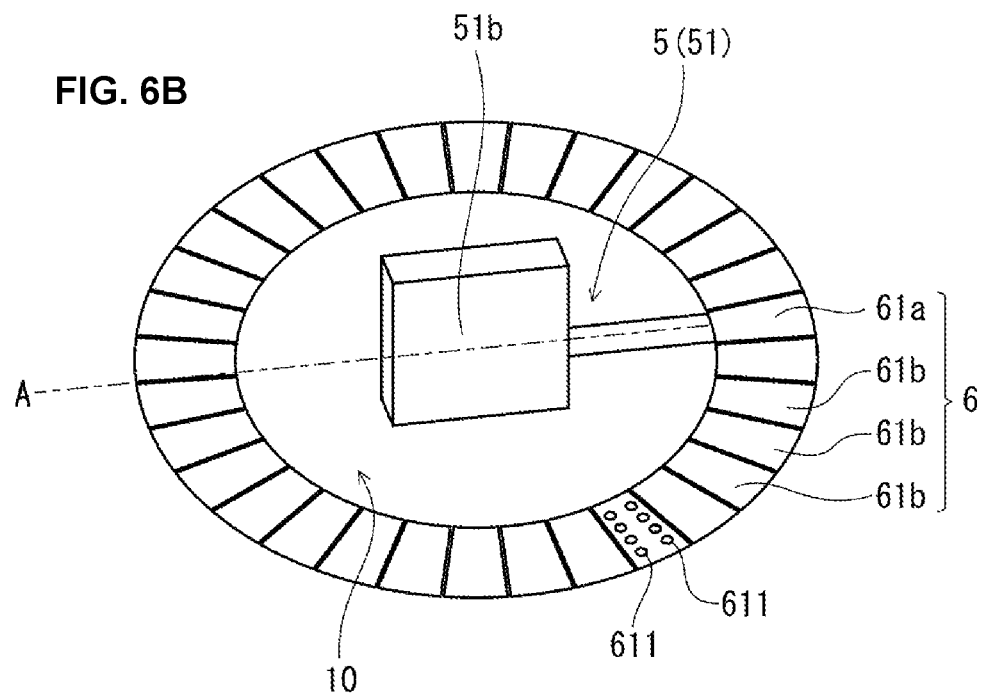

FIGS. 6A and 6B show a prize support member and an operation instructing part of a game device according to a second embodiment of the present invention. FIG. 6A is a perspective view showing that the prize support member is in a first state and FIG. 6B is a perspective view showing that the prize support member is in a second state.

Hereinafter, description will be made on the second embodiment by focusing on different points from the first embodiment described above and descriptions on the common points are omitted. It is to be noted that the same reference numerals are given to the same configurations as those of the first embodiment described above.

The game device 1 of this embodiment is the same as the game device 1 of the first embodiment except for the configurations of the defining part 4 and the prize support member 5. Concretely, the prize support member 5 of the second embodiment is constituted from one arm member 51. Such an arm member 51 has a flat-shaped mounting board 51b at a distal end thereof. Further, although not shown, the connecting portion 41 of the defining part 4 connects the arm member 51 rotatably.

An upper surface (mounting surface) of the mounting board 51b of the arm member 51 faces upward to be able to place (support) the prize in the first state (FIG. 6A). On the other hand, in the second state, the mounting surface of the mounting board 51b of the arm member 51 faces the near side in the figure to be able to release the support of the prize. That is, the mounting surface is provided by rotating 90° to the near side in the figure from the first state (FIG. 6B). In other words, as shown in FIGS. 6A and 6B, in the present embodiment, the arm member 51 is configured to be rotatable about an axis A coinciding with a longitudinal direction of the arm member 51 as a rotation axis.

The game can also be started with the state shown in FIG. 6B as the first state. That is, a side surface of the mounting board 51b may be used as the mounting surface. Further, the arm member 51 may be constituted to rotate with respect to the connecting portion 41. The arm member 51 may be fixed to the connecting portion 41 and the connecting portion 41 may be constituted to rotate with respect to the defining part 4. Further, an angle of rotating is not limited, but may be changed (rotated) in the stepwise fashion. Further, a shape of the mounting board 51b is also not particularly limited, but may be a circular shape, an elliptical shape, or a polygonal shape such as a triangle shape or a pentagon shape.

As described above, in the game device 1 of the present embodiment, only one arm member 51 is to be displaced. Therefore, it is necessary for the player to aim at the block body 61 (corresponding block body 61a) corresponding to the arm member 51 from the plurality (32 in the present embodiment) of block bodies 61 with a pinpoint in order to obtain the prize. For this reason, it is possible to give the player the fun aiming at the pinpoint. In addition, such a prize support member 5 has the functions of supporting the prize and physically accessing the prize, so that the game space can be effectively utilized.

Third Embodiment

Next, description will be made on a third embodiment of the game device of the present invention with reference to the attached drawings.

Figure 7A:
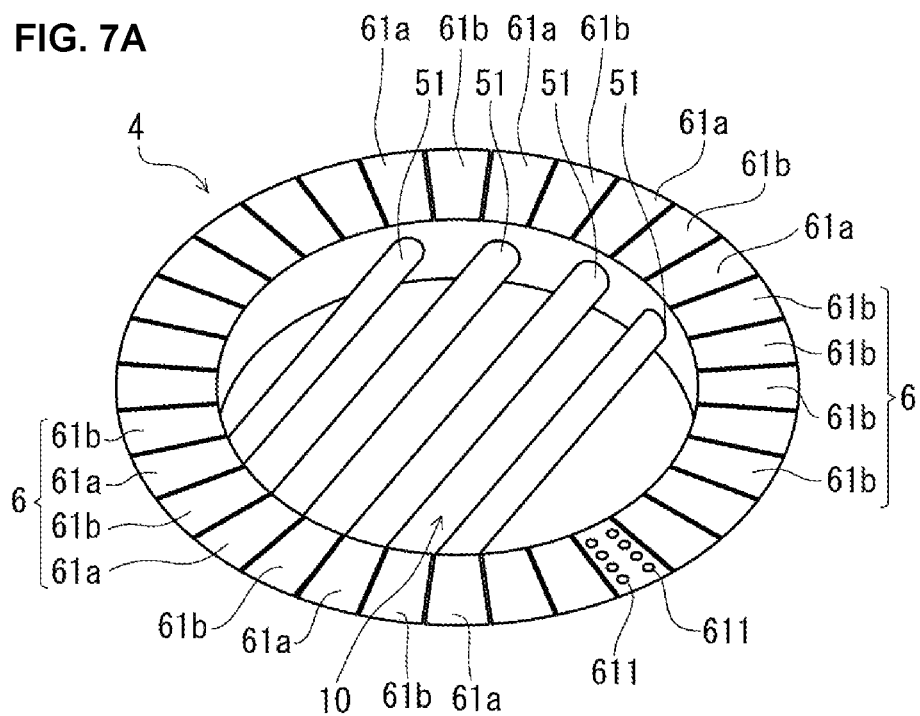
FIGS. 7A and 7B show a defining part, a prize support member and an operation instructing part of a game device according to a third embodiment of the present invention.
Figure 7B:
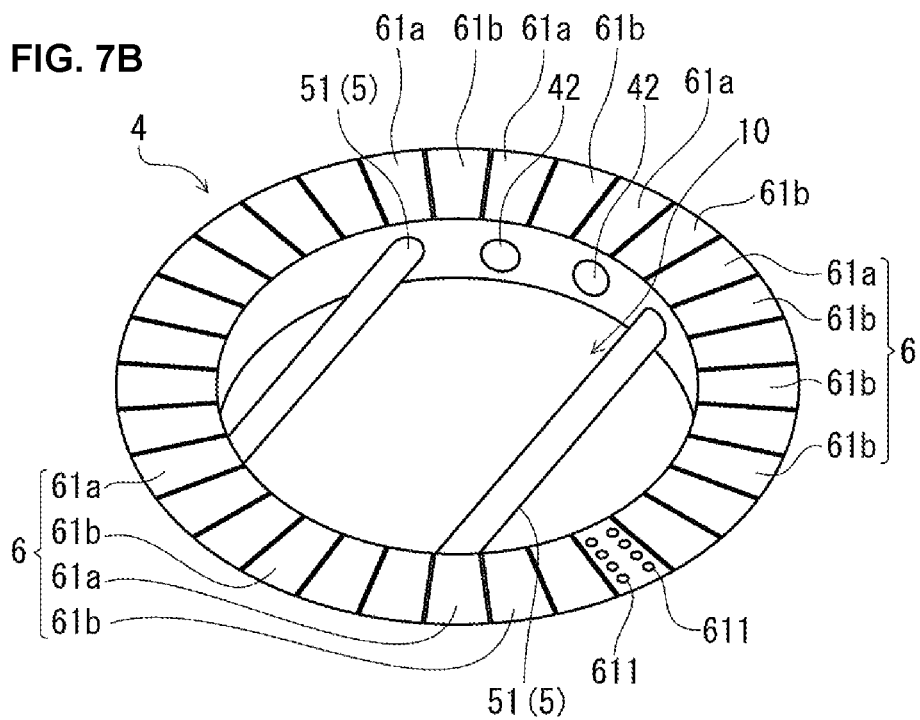

FIGS. 7A and 7B show a defining part, a prize support member and an operation instructing part of a game device according to a third embodiment of the present invention. FIG. 7A is a perspective view showing that the prize support member is in a first state and FIG. 7B is a perspective view showing that the prize support member is in a second state.

Hereinafter, description will be made on the third embodiment by focusing on different points from the first embodiment described above and descriptions on the common points are omitted. It is to be noted that the same reference numerals are given to the same configurations as those of the first embodiment described above.

The game device 1 of this embodiment is the same as the game device 1 of the first embodiment except for the configurations of the defining part 4 and the prize support member 5. Specifically, the prize support member 5 of the third embodiment includes a plurality (four in the present embodiment) of bar-like arm members 51 provided to cross the opening 10 in the first state. Further, the defining part 4 is provided with holes 42 at positions corresponding to both ends of each arm member 51 on the inner peripheral surface thereof. That is, the defining part 4 is provided with eight holes 42. A diameter of each of the holes 42 corresponds to a diameter of the arm member 51. Thus, the defining part 4 is constituted to be able to accommodate the arm members 51.

Such arm members 51 are constituted to be retractable to be accommodated in the defining part 4 in the second state. In FIG. 7B, it is shown that the two arm members 51 are in the second state (a state of being accommodated in the defining part 4). In this case, the arm members 51 in the second state may be accommodated in the defining part 4 from the holes 42 (not shown) on the near side or in the defining part 4 from the holes 42 on the back side. In the second state, only a part of each of the arm members 51 may be accommodated in the defining part 4 or the arm members 51 may be accommodated gradually in the defining part 4 from the first state to the second state. Further, the number of the arm members 51 is not particularly limited, but may be the odd number or the even number and more or less than four.

In the present embodiment, in the first state, both ends of each arm member 51 are provided to correspond to the corresponding block bodies 61a. That is, there are two corresponding block bodies 61a corresponding to one arm member 51. Even if any corresponding block body 61a is lit by the operation of the player, it is possible to displace the arm member 51 corresponding to the lighted corresponding block body 61a. As a result, the probability that the desired arm member 51 can be selected is increased, thereby enabling the difficulty level of the game to be lowered. Thus, it is possible to provide the advantageous game device 1 to the player. Also, the same effects as those of the first embodiment can be obtained by the game device 1 of the third embodiment.

Fourth Embodiment

Next, description will be made on a fourth embodiment of the game device of the present invention with reference to the attached drawings.

Figure 8:
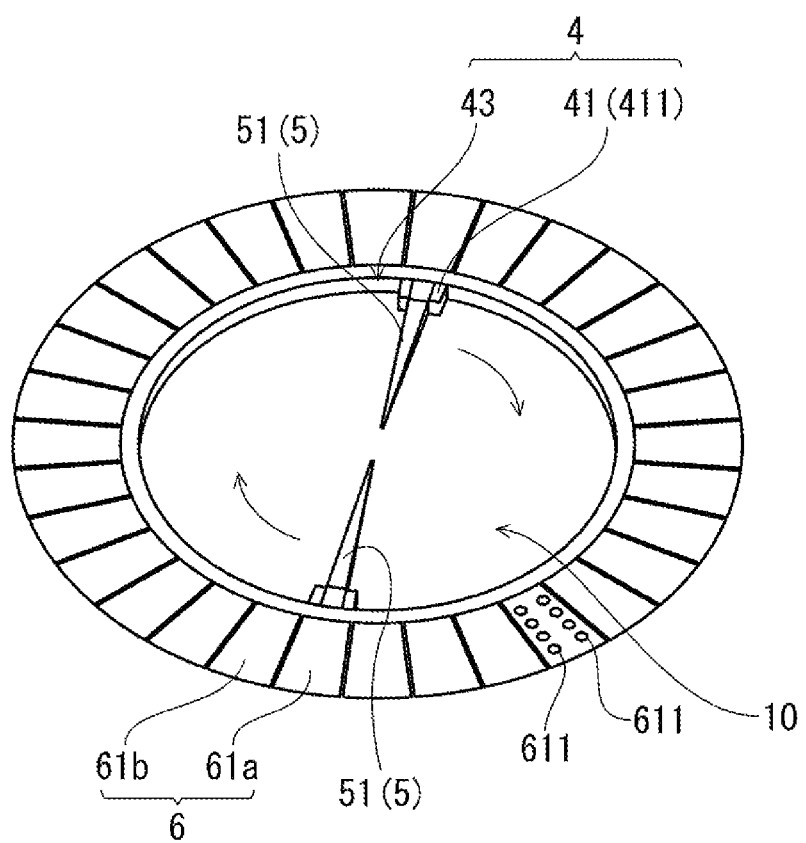
FIG. 8 is a perspective view showing a defining part, a prize support member and an operation instructing part of a game device according to a fourth embodiment of the present invention.

FIG. 8 is a perspective view showing a defining part, a prize support member and an operation instructing part of a game device according to a fourth embodiment of the present invention.

Hereinafter, description will be made on the fourth embodiment by focusing on different points from the first embodiment described above and descriptions on the common points are omitted. It is to be noted that the same reference numerals are given to the same configurations as those of the first embodiment described above.

The game device 1 of this embodiment is the same as the game device 1 of the first embodiment except for the configurations of the defining part 4 and the prize support member 5. Specifically, the prize support member 5 of the fourth embodiment includes a plurality (two in the present embodiment) of long arm members 51. The defining part 4 includes a guide rail member 43. The guide rail member 43 is constituted so that the arm members 51 rotate along the circumferential direction of the defining part 4 (opening 10). In FIG. 8, arrows are depicted in the clockwise direction If the player performs the input to the operation unit 3 and the corresponding block bodies 61a corresponding to the arm members 51 are lighted, the arm member 51 rotates in the clockwise direction while the distal end thereof faces the center of the opening 10. The arm members 51 may rotate corresponding to the block bodies 61. An angle of rotating is, for example, preferably 15 to 90°, and more preferably 30 to 60°.

In this regard, if one arm member 51 rotates in one direction, a case where the arm member 51 and another arm member 51 interfere (are adjacent) may occur. In this case, even if the one arm member 51 is selected, it may not necessary to move it. Moreover, in the case where the one arm member 51 rotates, another arm member 51 may be constituted to rotate in conjunction with each other. Further, the number of arm members 51 is not particularly limited, but may be the odd number or the even number and more or less than two.

Thus, in the present embodiment, the arm members 51 are provided along the surface direction of the opening 10 from the proximal end to the distal end thereof in any state of the first state and the second state. In other words, the arm members 51 extend in the radial direction of the opening 10 in both the first state and the second state. Thus, since the arm members 51 shift in a horizontal direction, it becomes difficult for the prize to fall depending on the shape, size, arrangement, and the like. As a result, it is possible to increase the difficulty level of the game, so that the player can be entertained continuously. The game device 1 of the fourth embodiment has also the same effects as those of the first embodiment.

Fifth Embodiment

Next, description will be made on a fifth embodiment of the game device of the present invention with reference to the attached drawings.

Figure 9:
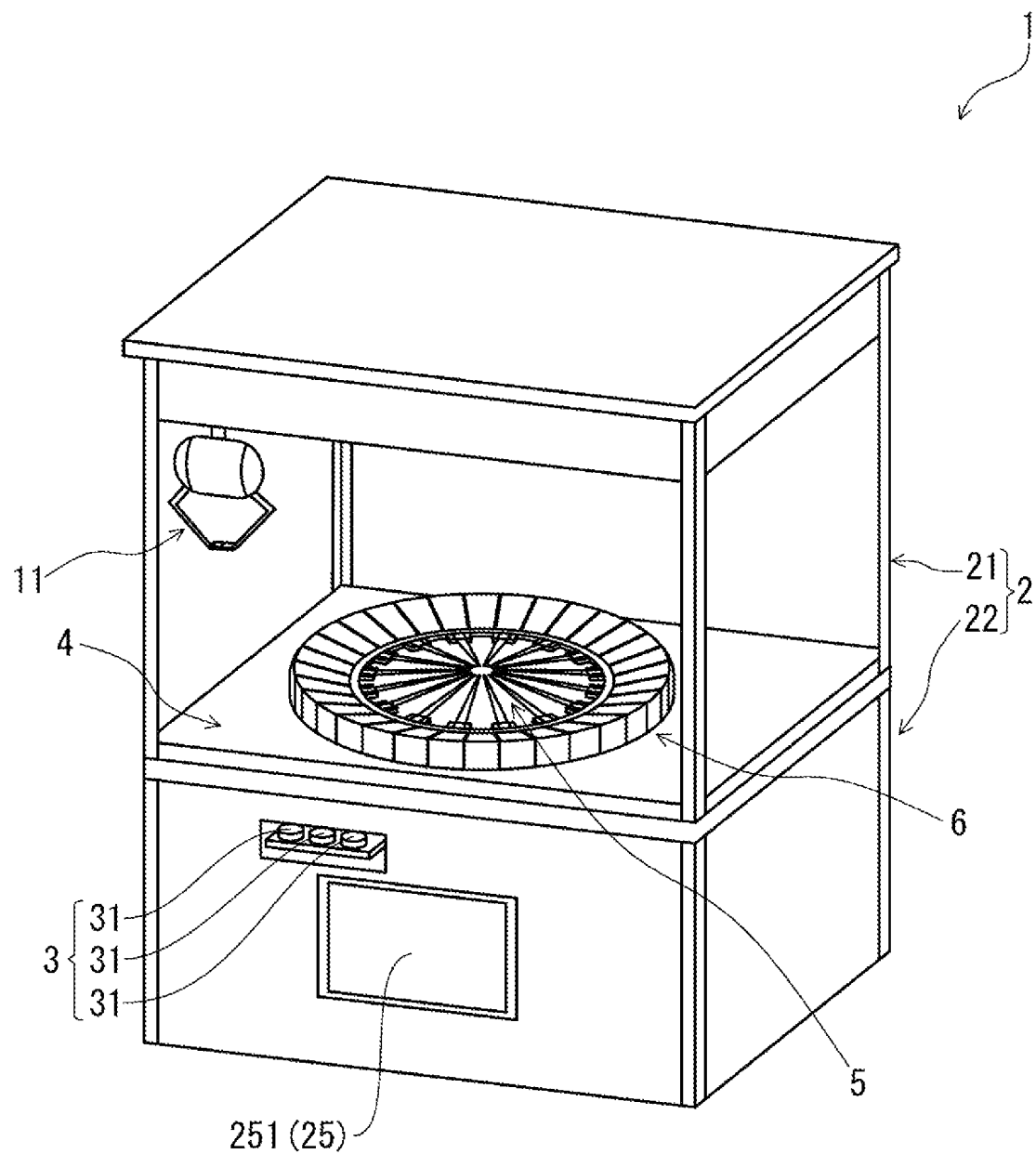
FIG. 9 is a perspective view showing a game device according to a fifth embodiment of the present invention.

FIG. 9 is a perspective view showing a game device according to a fifth embodiment of the present invention.

Hereinafter, description will be made on the fifth embodiment by focusing on different points from the first embodiment described above and descriptions on the common points are omitted. It is to be noted that the same reference numerals are given to the same configurations as those of the first embodiment described above.

The game device 1 of this embodiment is the same as the game device 1 of the first embodiment except for the shape of the housing 2, the configuration of the operation part 3, and the existence of a crane unit 11. Specifically, the game device 1 of the fifth embodiment includes a rectangular parallelepiped housing 2, an operation part 3 having three push buttons 31, and the crane unit 11 which holds and moves the prize as a movable unit. Two of the three push buttons 31 are used to operate the crane unit 11. The player operates the crane unit 11 together with the operation of the prize support member 5 to obtain the prize.

Specifically, the player displaces the predetermined arm members 51 to the second state and exposes the opening 10 to such an extent that the prize can fall. Thereafter, the prize is held and moved to the exposed openings by the crane unit 11 to drop. Further, after the position of the prize is changed by the crane unit 11, the arm members 51 can be also displaced to the second state to drop the prize. The crane unit 11 may be operable or may not be operable. Further, as a means for operating the crane unit 11, an operation stick may be provided instead of or in addition to the two push buttons 31

According to the game device 1 of the fifth embodiment, for example, by reusing the conventional crane game machine which has lost popularity, the game space can be effectively used, so that it is possible to provide the game device having the enhanced entertainment.

Sixth Embodiment

Next, description will be made on a sixth embodiment of the game device of the present invention with reference to the attached drawings.

Figure 10A:
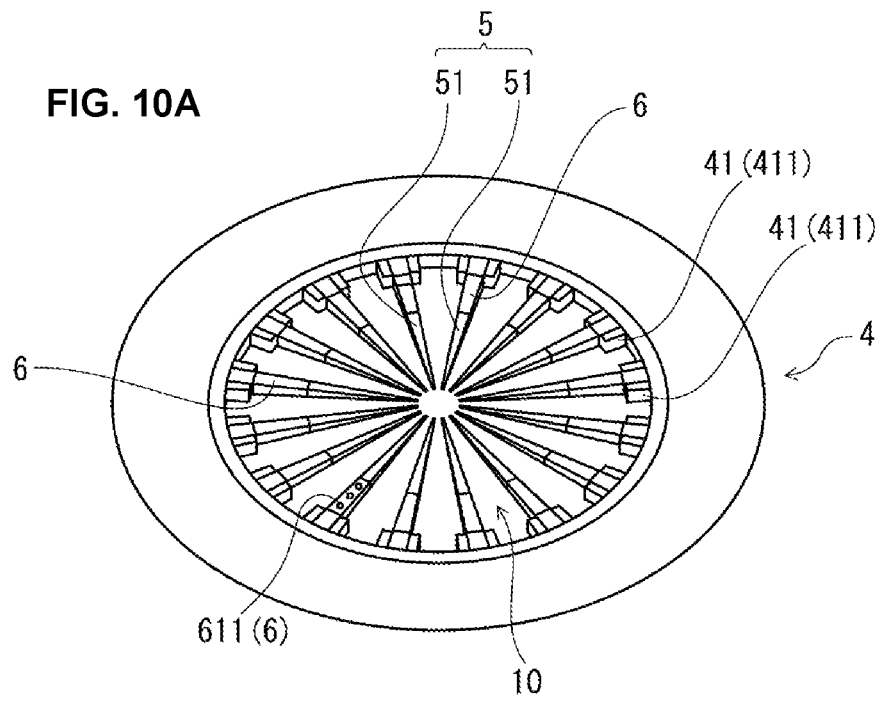
FIGS. 10A and 10B are perspective views showing a defining part, a prize support member and an operation instructing part of a game device according to a sixth embodiment of the present invention.
Figure 10B:
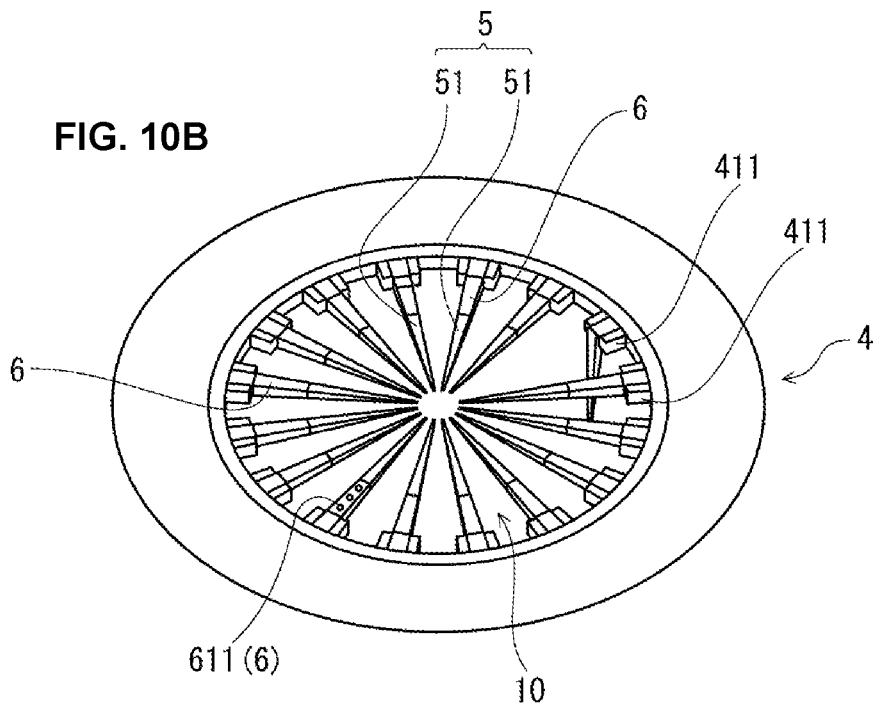

FIGS. 10A and 10B are perspective views showing a defining part, a prize support member and an operation instructing part of a game device according to a sixth embodiment of the present invention.

Hereinafter, description will be made on the sixth embodiment by focusing on different points from the first embodiment described above and descriptions on the common points are omitted. It is to be noted that the same reference numerals are given to the same configurations as those of the first embodiment described above.

The game device 1 of this embodiment is the same as the game device 1 of the first embodiment except for the configurations of the prize support member 5 and the operation instructing part 6. In the present embodiment, the prize support member 5 and the operation instructing part 6 are integrally provided. Specifically, the operation instructing part 6 is constituted from not the block bodies 61 but a plurality (16 in the present embodiment) of lighting devices 611. Each of the lighting devices 611 is provided not on the top surface of the defining part 4 but on the proximal end side inside each arm member 51. In other words, in the present embodiment, the arm members 51 play the same role as that of the block bodies 61 (corresponding block bodies 61a) of the first embodiment. There are no non-corresponding block bodies 61b. Therefore, the upper surface of the defining part 4 is exposed, and the player can always select any one of the arm members 51. Each of the lighting devices 611 includes a plurality (three in the present embodiment) of LEDs.

According to such a configuration, for example, prizes for display can be arranged on the upper surface of the defining part 4. It is possible to utilize the game space more effectively. Further, since the width of the defining part 4 can be omitted, it is also possible to reduce the size of the defining part 4 while maintaining the size of the opening 10. This makes it possible to provide a more compact game device 1. The game device 1 of the sixth embodiment has the same effects as those of the first embodiment.

Seventh Embodiment

Next, description will be made on a seventh embodiment of e game device of the present invention with reference to the attached drawings.

Figure 11A:
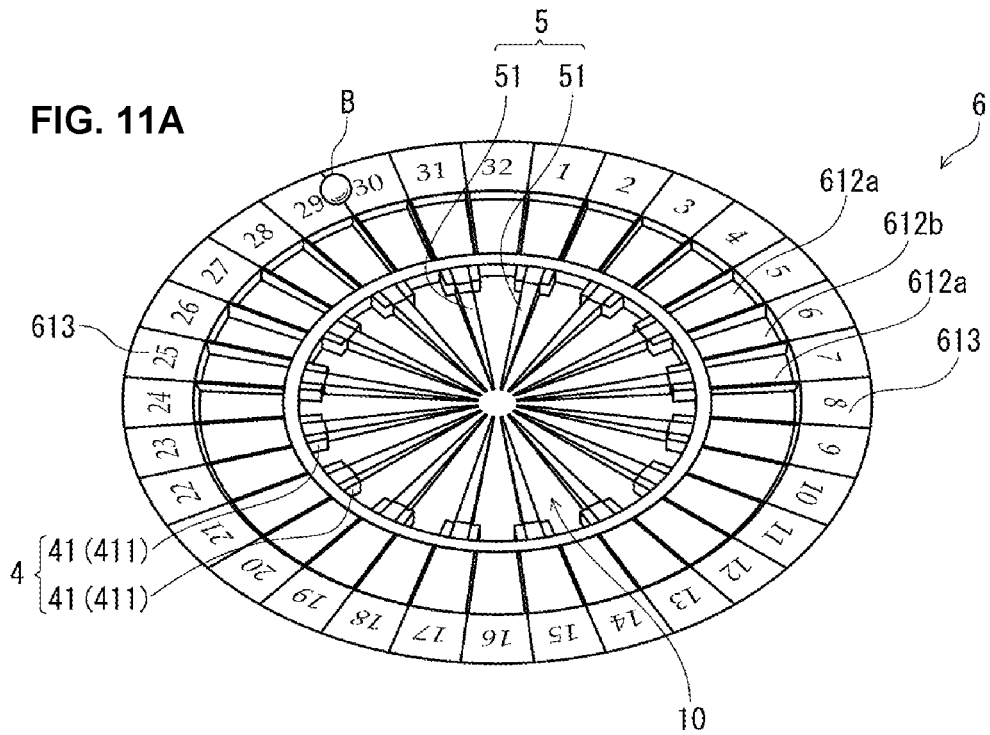
FIGS. 11A and 11B are perspective views showing a defining part, a prize support member and an operation instructing part of a game device according to a seventh embodiment of the present invention.
Figure 11B:
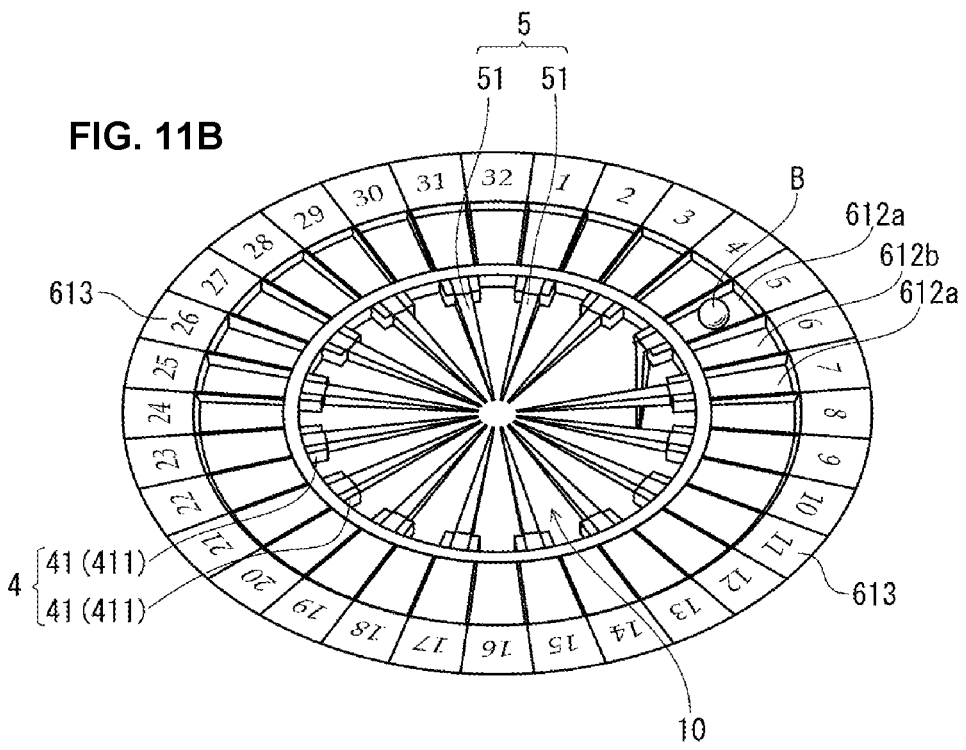

FIGS. 11A and 11B are perspective views showing a defining part, a prize support member and an operation instructing part of a game device according to a seventh embodiment of the present invention.

Hereinafter, description will be made on the seventh embodiment by focusing on different points from the first embodiment described above and descriptions on the common points are omitted. It is to be noted that the same reference numerals are given to the same configurations as those of the first embodiment described above.

The game device 1 of this embodiment is the same as the game device 1 of the first embodiment except for the configuration of the operation instructing part 6. The operation instructing part 6 of the present embodiment has a roulette function. The operation instructing part 6 also has a plurality (32 in the present embodiment) of pockets 612, a rotary plate 613 provided on an outer peripheral side of the plurality of pockets 612, and a ball B moving on the rotary plate 613. The number of the pockets 612 is not particularly limited, and may be the odd number or the even number and more or less than 32. The number of the ball B is not also particularly limited.

The plurality of pockets 612 are constituted from 16 corresponding pockets 612a provided adjacent to the arm members 51 and to correspond to the arm members 51 and 16 non-corresponding pockets 612b provided between the arm members 51 and not to correspond to the arm members 51. That is, the corresponding pockets 612a and the non-corresponding pockets 612b are alternately provided.

The rotary plate 613 is formed into an annular shape and is constituted to be rotatable with respect to the plurality of pockets 612. A frame line corresponding to each pocket 612 and numbers of 1 to 32 assigned to a frame are shown on an upper surface of the rotary plate 613. A rotation direction of the rotary plate 613 may be clockwise or counterclockwise. A motor for rotating the rotary plate 613 and a supply mechanism and a recovery mechanism for the ball B are not shown.

The ball B is supplied onto the rotating rotary plate 613. Any one of the plurality of pockets 612 receives the ball B after moving on the rotary plate 613. Thereby, it is instructed to the player whether the arm member 51 corresponding to the pocket 612 which has received the ball B is presence or absence (presence or absence of the arm member 51 to be displaced). During this time, the information processing unit 92 determines the presence or absence of the corresponding arm member 51 and determines the arm member 51 to be displaced. In the present embodiment, for example, by providing a weight sensor or a pressure sensor in each pocket 612, the information processing unit 92 can determine the presence or absence of the corresponding arm member 51.

Even with such a configuration, since the prize support member 5 is provided, the game space can be effectively utilized as the first embodiment. As described above, the game device 1 of the present invention can also introduce a conventional game (for example, a roulette game) to entertain the player.

The operation instructing part 6 described above has a physical mechanism configured to play the roulette game. However, it is also possible to replace the physical mechanism with an electrical mechanism (for example, a liquid crystal display device). In this case, since the operation control unit 93 controls the ball B displayed on the liquid crystal display device to rotate the outer periphery of the arm members 51, when the player pushes the push button 31 at a desired timing, the display can be controlled so that the rotation of the ball B is stopped and the pocket 612 closest to the stop position receives the ball B. This makes it possible to instruct the presence and absence of the arm member 51 to be displaced to the player. According to such a configuration, since the player can aim at the desired arm member 51 by itself, the same effects as those of the first embodiment can be obtained.

Eighth Embodiment

Next, description will be made on an eighth embodiment of the game device of the present invention with reference to the attached drawings.

Figure 12A:
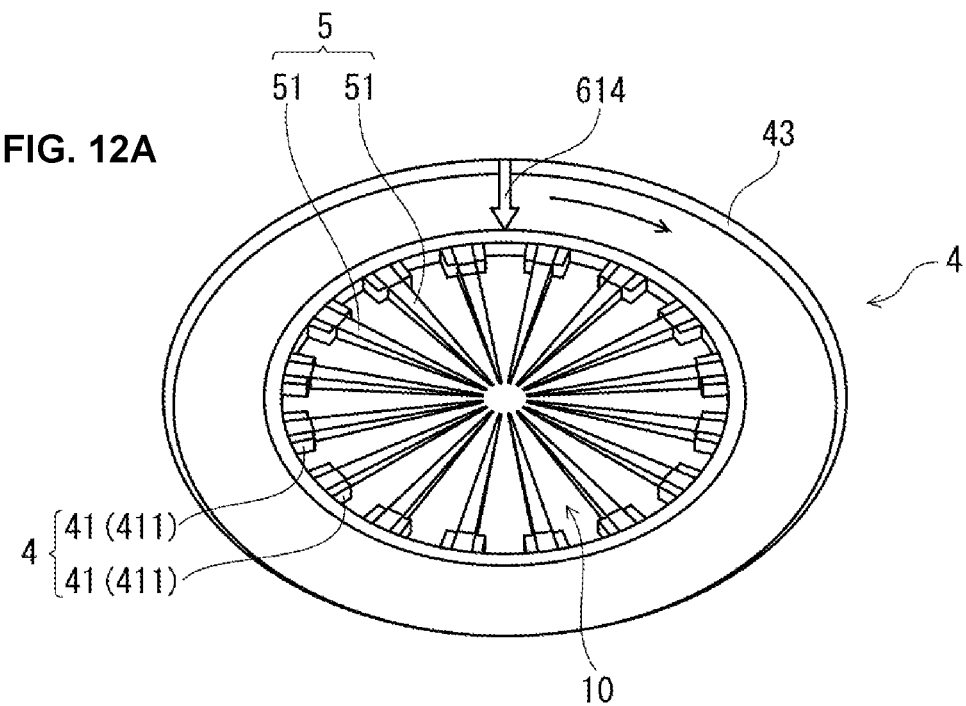
FIGS. 12A and 12B are perspective views showing a defining part, a prize support member and an operation instructing part of a game device according to an eighth embodiment of the present invention.
Figure 12B:
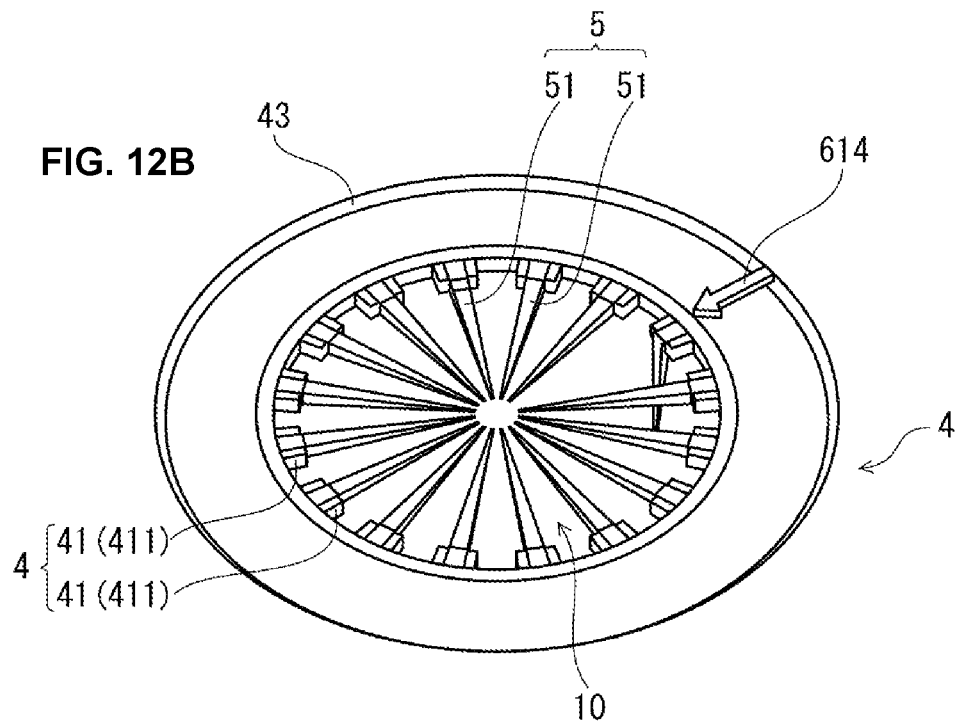

FIGS. 12A and 12B are perspective views showing a defining part, a prize support member and an operation instructing part of a game device according to an eighth embodiment of the present invention.

Hereinafter, description will be made on the eighth embodiment by focusing on different points from the first embodiment described above and descriptions on the common points are omitted. It is to be noted that the same reference numerals are given to the same configurations as those of the first embodiment described above.

The game device 1 of this embodiment is the same as the game device 1 of the first embodiment except for the configurations of the defining part 4 and the operation instructing part 6. Specifically, the defining part 4 of the present embodiment includes a guide rail member 43 constituted to rotate along an inside of an outer peripheral edge thereof. Further, the operation instructing part 6 is constituted of a single arrow member 614 and connected to the guide rail member 43 at its proximal end. This makes it possible for the arrow member 614 to rotate along the circumferential direction of the defining part 4 (opening 10) while the distal end of the arrow member 614 indicates the center of the opening 10. In this regard, although the arrow in a direction which the arrow member 614 rotates clockwise is depicted in FIG. 12, a rotation direction of the arrow member 614 is not particularly limited. For example, the arrow member 614 may be controlled to rotate counterclockwise and repeat clockwise and counterclockwise alternately.

When the game starts, the arrow member 614 rotates clockwise around the outer periphery of the arm members 51. Thereafter, when the player pushes the push button 31 at a desired timing, the operation control unit 93 stops the rotation of the arrow member 614. As a result, it is instructed whether the arm member 51 to be displaced is present or absence to the player. Specifically, if the distal end of the stopped arrow member 614 indicates the arm member 51, the information processing unit 92 can determine that there is the arm member 51 to be displaced. On the other hand, if it is not shown, the information processing unit 92 can determine that there is no arm member 51 to be displaced. In this regard, a position of the arrow member 614 may be detected by the camera provided in the game space of the upper main body 21.

Depending on the position at which the arrow member 614 stops, there is a case that the determination concerning the presence or absence of the arm member 51 to be displaced may become unclear. For example, in the case where the distal end of the arrow member 614 stops at positions where the connecting portions 41 of the defining part 4 are indicated, it becomes unclear that it is determined that the arm member 51 is selected or not selected. If the storage unit 8 stores determination criteria in such a case in advance, a range of the difficulty level of the game is expanded. For example, in the case where the distal end of the arrow member 614 stops within a range of the inner peripheral surface of the defining part 4 corresponding to the arm member 51 and the connecting portions 41 that sandwiches it, it is possible to set the determination criterion that the arm member 51 is selected. Further, in the case where the distal end of the arrow member 614 stops within the range of the inner peripheral surface of the defining part 4 corresponding to the arm member 51, it is possible to set the determination criterion that the arm member 51 is selected. The latter case can increase the difficulty level of the game than the former case. As a result, it is possible to provide the game device 1 which can be enjoyed by various kinds of users (beginners and advanced users). The arrow member 614 may be fixed and the prize support member 5 may be rotated as shown in FIG. 8. Alternatively, the arrow member 614 and the prize support member 5 may be simultaneously rotated.

According to such a game device 1 of the eighth embodiment, it is possible for the player to enjoy the feeling of aiming at the arm member 51 more. Also, the game device 1 of the eighth embodiment can obtain the same effects as those of the first embodiment.

Ninth Embodiment

Next, description will be made on a ninth embodiment of the game device of the present invention with reference to the attached drawings.

Figure 13A:
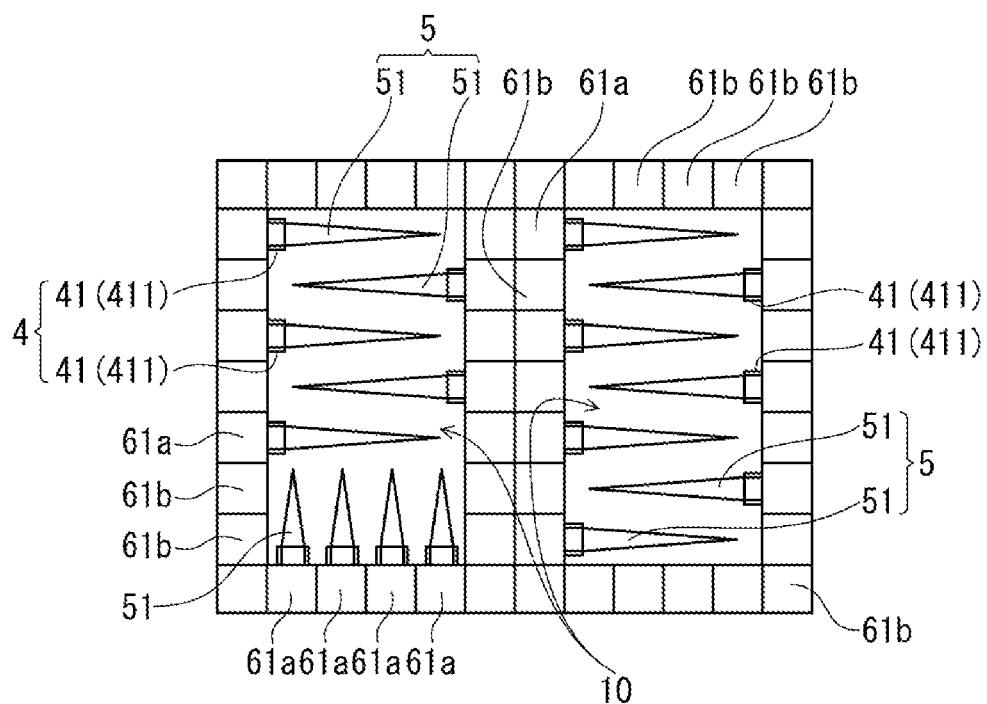
FIGS. 13A and 13B are top views showing a defining part, a prize support member and an operation instructing part of a game device according to a ninth embodiment of the present invention.
Figure 13B:
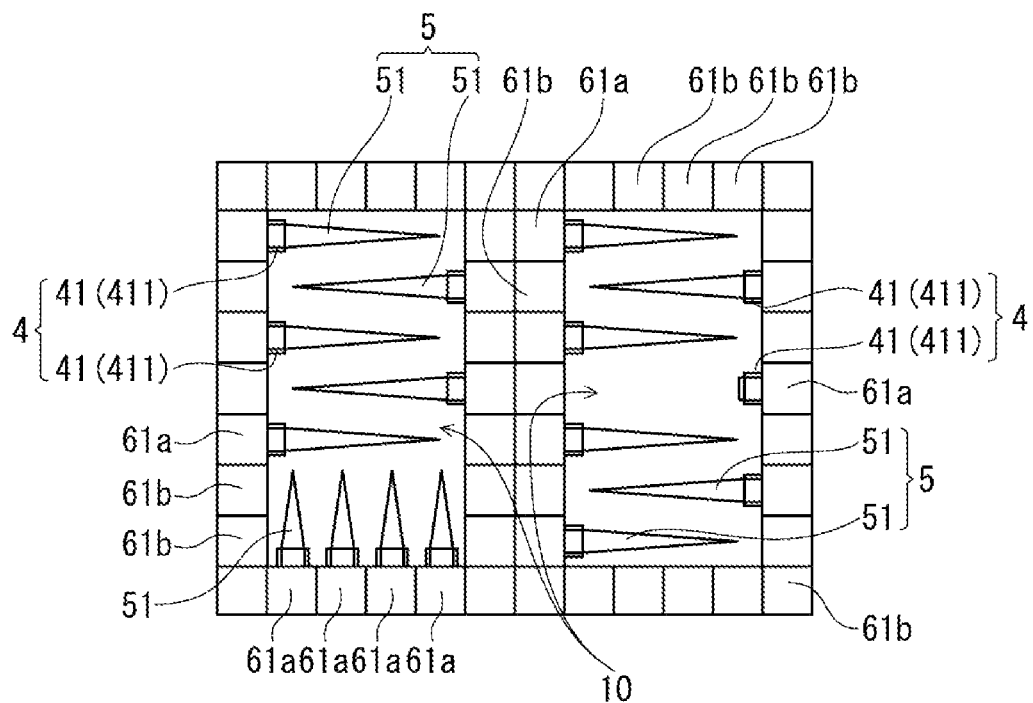

FIGS. 13A and 13B are top views showing a defining part, a prize support member and an operation instructing part of a game device according to a ninth embodiment of the present invention.

Hereinafter, description will be made on the ninth embodiment by focusing on different points from the first embodiment described above and descriptions on the common points are omitted. It is to be noted that the same reference numerals are given to the same configurations as those of the first embodiment described above.

The game device 1 of this embodiment is the same as the game device 1 of the first embodiment except that the configuration of the defining part 4, the shape of the opening 10, and the arrangements of the prize support member 5 and the operation instructing part 6 are different. Specifically, the defining part 4 is a rectangular frame in which middle points of the long sides thereof are connected to each other. In other words, the defining part 4 is constituted so that two rectangular frames are adjacent to each other at their long sides. Thus, two rectangular openings 10 are formed.

The prize support member 5 of the present embodiment is provided in parallel on the long side and the short side of the rectangular-shaped defining part 4, respectively. Thus, the arm members 51 provided on the long side and the arm members 51 provided on the short side are provided in the defining part 4 in a manner to be orthogonal to each other.

According to such a configuration, the manager of the game device 1 can use various kinds of placing methods. In addition, a wide variety of a blinking pattern (the blinking direction and the like) of the lighting devices 611 of the operation instructing part 6 is obtained. For example, each of lighting devices 611 can be blinked to draw a figure of eight. For these reasons, the player can be entertained continuously. The arm members 51 may be provided only on either the long side or the short side. In this case, the exposed area of the opening 10 in the plan view becomes large, so that it is possible to more effectively give the player a feeling of likely obtaining the prize. As a result, it is possible to give the player the incentive to play the game device 1. Also, the game device 1 of the ninth embodiment has the same effects as those of the first embodiment.

Tenth Embodiment

Next, description will be made on a tenth embodiment of the game device of the present invention with reference to the attached drawings.

Figure 14A:
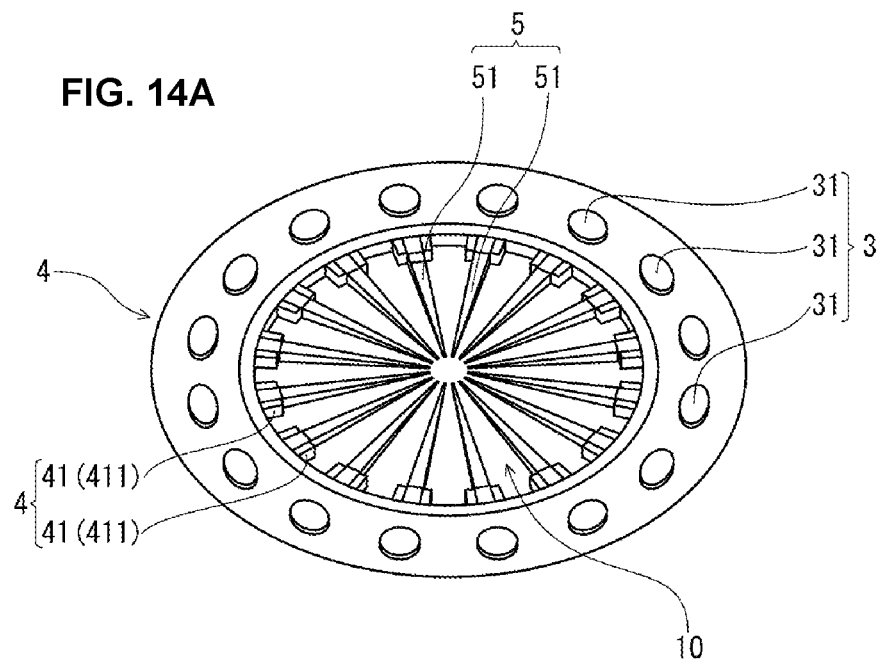
FIGS. 14A and 14B are perspective views showing an operation part, a defining part and a prize support member of a game device according to a tenth embodiment of the present invention.
Figure 14B:
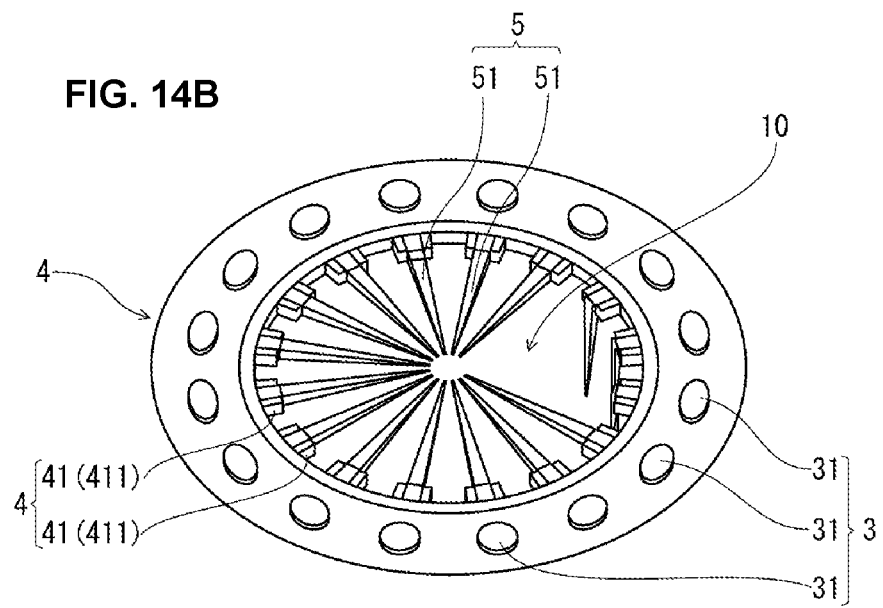

FIGS. 14A and 14B are perspective views showing an operation part, a defining part and a prize support member of a game device according to a tenth embodiment of the present invention.

Hereinafter, description will be made on the tenth embodiment by focusing on different points from the first embodiment described above and descriptions on the common points are omitted. It is to be noted that the same reference numerals are given to the same configurations as those of the first embodiment described above.

The game device 1 of this embodiment is the same as the game device 1 of the first embodiment except for the configurations of the operation part 3 and the operation instructing part 6. Specifically, in the game device 1 of the present embodiment, the operation part 3 includes a plurality (16 in the present embodiment) of push buttons 31. Each push button 31 is provided on the upper surface of the defining part 4 in one-to-one correspondence with the arm members 51 so as to be adjacent to the arm members 51. This makes it possible for the player to necessarily displace the arm member 51 by pushing the push button 31 corresponding to the arm member 51 to be displaced. Thus, in the present embodiment, the operation part 3 also functions as the operation instructing part 6. In this regard, although not shown, the side peripheral wall surface 211 of the upper main body 21 may be provided so that the diameter thereof corresponds to the inner diameter of the defining part 4.

According to such a configuration, since it is possible to necessarily displace the desired arm member 51, it is possible to give the player the incentive to play the game device 1. Further, since it is not necessary to provide the operation instructing part 6 separately, a more compact game device 1 can be provided. The game device 1 of the tenth embodiment also has the same effects as those of the first embodiment.

As described above, although the description is made on the game device of the present invention based on the preferable embodiment, the present invention is not limited thereto. The composition of each part may be replaced with arbitrary composition which has the same function. Also, any other means or component may be added to the present invention. Further, the present invention may be a combination of any two or more configurations (features) of the above-described embodiments.

INDUSTRIAL APPLICABILITY

The game device of the present invention has the defining part for defining the opening to allow the prize to fall, the operation part for receiving the input information, the prize support member for supporting the prize, wherein the prize support member is configured to be operable by that the operation part receives the input information, and the operation control unit for controlling the movement of the prize support member. The prize support member is provided above the opening so as to expose the opening. This makes it possible to provide the game device which is capable of effectively utilizing the space inside the housing and has the enhanced amusement. Accordingly, the present invention has industrial applicability.

EXPLANATION OF REFERENCE NUMERAL

1 Game device
2 Housing
21 Upper main body
211 Side peripheral wall surface
212 Upper wall surface
213 Display stand
22 Lower main body
23 Cover member
24 Brace members
25 Prize outlet box
251 Prize outlet
3 Operation part
31 Push button
41 Defining part
4 Connecting portions
411 Side plate portions
42 Holes
43 Guide rail member
5 Prize support member
51 Arm members
51b Mounting board
6 Operation instructing part
61 Block bodies
61a Corresponding block bodies
61b Non-corresponding block bodies
611 Display devices
612 Pockets
612a Corresponding pockets
612b Non-corresponding pockets
613 Rotary plate
614 Arrow member
7 Detection unit
8 Storage unit
9 Control unit
91 Information acquisition unit
92 Information processing unit
93 Operation control unit
10 Opening
11 Crane unit
B Ball

What is claimed is:

1. A game device comprising:
a defining part for defining an opening to allow a prize to fall;
an operation part for receiving input information;
a prize support member for supporting the prize, the prize support member configured to be operable so that the operation part receives the input information;
an operation instructing part provided to correspond to the prize support member to be displaced; and
an operation control unit for controlling movement of the prize support member and the operation instructing part,
wherein the prize support member is above the opening so as to expose the opening, and a first end of the prize support member is attached to the defining part, and
wherein the prize support member includes a plurality of arm members and the operation instructing part includes a plurality of block bodies for instructing any one of the arm bodies by lighting, and wherein the plurality of arm members corresponds to the plurality of block bodies.

2. The game device claimed in claim 1, wherein the plurality of block bodies is provided on the defining part.

3. The game device claimed in claim 1, wherein the plurality of block bodies is provided so as to surround the opening along a circumferential direction of the opening.

4. A game device comprising:
a defining part for defining an opening to allow a prize to fall;
an operation part for receiving input information;
a housing having a game space in which the prize is supported and a space in which the prize drops, the space communicating with the game space through the defining part;
a prize support member for supporting the prize, the prize support member configured to be operable so that the operation part receives the input information;
an operation instructing part provided to correspond to the prize support member to be displaced; and
an operation control unit for controlling movement of the prize support member and the operation instructing part,
wherein the prize support member is above the opening so as to expose the opening, and a first end of the prize support member is attached to the defining part.

5. The game device claimed in claim 4, wherein the prize support member displaces so that an exposed area of the opening changes in a plan view.

6. The game device claimed in claim 4, wherein the prize support member is displaceable between a first state configured to support the prize and a second state configured to release the support of the prize.

7. The game device claimed in claim 6, wherein the prize support member displaces in a stepwise fashion from the first state to the second state.

8. The game device claimed in claim 4, wherein the prize support member is inclined with respect to a surface direction of the opening.

9. The game device claimed in claim 4, wherein the prize support member is detachable.

10. The game device claimed in claim 4, wherein the prize support member is formed into an elongated shape.

11. The game device claimed in claim 4, wherein the prize support member includes a plurality of arm members, and
the plurality of arm members is provided on the defining part at one end of the plurality of arm members.

12. The game device claimed in claim 11, wherein an outer diameter of each of the arm members gradually decreases from the one end to the other end.

13. The game device claimed in claim 4, wherein the defining part defines the opening having a circular shape, an elliptical shape, a polygonal shape, a rectangular shape, or a curved shape.

14. The game device claimed claim 11, wherein the defining part defines the opening having a circular shape, and
the plurality of arm members is provided along a circumferential direction of the opening.

15. The game device claimed in claim 5, wherein the prize support member is displaceable between a first state capable of supporting the prize and a second state capable of releasing the support of the prize.

16. The game device claimed in claim 6, wherein the prize support member is inclined with respect to a surface direction of the opening.

17. The game device claimed in claim 6, wherein the prize support member is detachable.

18. The game device claimed in claim 8, wherein the prize support member is formed into an elongated shape.

19. The game device claimed in claim 7, wherein the prize support member includes a plurality of arm members, and the plurality of arm members is provided on the defining part at one end of the plurality of arm members.

* * * * *